United States Patent
Maekawa

(10) Patent No.: US 11,186,157 B2
(45) Date of Patent: Nov. 30, 2021

(54) CONTROL DEVICE FOR VEHICULAR POWER STORAGE UNIT AND VEHICULAR POWER STORAGE DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Kosei Maekawa, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 262 days.

(21) Appl. No.: 16/334,810

(22) PCT Filed: Sep. 12, 2017

(86) PCT No.: PCT/JP2017/032889
§ 371 (c)(1),
(2) Date: Mar. 20, 2019

(87) PCT Pub. No.: WO2018/056119
PCT Pub. Date: Mar. 29, 2018

(65) Prior Publication Data
US 2020/0168867 A1    May 28, 2020

(30) Foreign Application Priority Data
Sep. 23, 2016 (JP) .............................. JP2016-185549

(51) Int. Cl.
*H02J 7/00* (2006.01)
*B60K 1/04* (2019.01)
(Continued)

(52) U.S. Cl.
CPC ................ *B60K 1/04* (2013.01); *B60L 50/60* (2019.02); *H01M 10/443* (2013.01);
(Continued)

(58) Field of Classification Search
CPC ........ B60K 1/04; H02J 7/00; H02J 7/007194; H02J 7/007192; H01M 10/615;
(Continued)

(56) References Cited

U.S. PATENT DOCUMENTS 5,055,656 A * 10/1991 Farah ................ H02J 7/007192
219/209
7,583,053 B2 * 9/2009 Kamohara .......... F02N 11/0862
320/106
(Continued)

FOREIGN PATENT DOCUMENTS

JP    2012-069496 A    4/2012

OTHER PUBLICATIONS

International Search Report, Application No. PCT/JP2017/032889, dated Dec. 5, 2017.

*Primary Examiner* — Stacy Whitmore
(74) *Attorney, Agent, or Firm* — Honigman LLP

(57) ABSTRACT

Provided is a control device or a power storage device configured to efficiently increase the temperature of a vehicular power storage unit, while suppressing an increase in the size of the configuration. A control device includes: a holding unit that holds a power storage unit; a board unit in which one board surface is arranged on the power storage unit side; a charging circuit unit that performs charging operations of supplying charging current to the power storage unit; and a resistance unit, mounted on the one board surface of the board unit and disposed between the board unit and the power storage unit, wherein current flows in the resistance unit in response to a circuit unit performing (Continued)

predetermined charging operations, and the resistance unit emits heat at least toward the power storage unit.

12 Claims, 13 Drawing Sheets

(51) Int. Cl.
*H01M 10/625* (2014.01)
*H01M 10/6571* (2014.01)
*H01M 10/44* (2006.01)
*B60L 50/60* (2019.01)
*H01M 50/20* (2021.01)

(52) U.S. Cl.
CPC ..... *H01M 10/625* (2015.04); *H01M 10/6571* (2015.04); *H01M 50/20* (2021.01); *H02J 7/007192* (2020.01); *H02J 7/007194* (2020.01)

(58) Field of Classification Search
CPC ............. H01M 50/20; H01M 10/625; H01M 10/6571; H01M 10/443; H01M 10/486; H01M 2220/20; H01M 10/63; H01M 10/425; B60L 50/60; B60L 2240/529; B60L 2240/549; B60L 1/02; B60L 58/27; B60L 50/40; Y02E 60/10; B60Y 2400/114; Y02T 10/70; B60R 16/04
See application file for complete search history.

(56) References Cited

U.S. PATENT DOCUMENTS

| | | | |
|---|---|---|---|
| 9,893,333 B2 * | 2/2018 | Hoshi | B60K 1/04 |
| 2003/0162084 A1 | 8/2003 | Shigeta et al. | |
| 2005/0110460 A1 * | 5/2005 | Arai | H01M 10/6563 320/116 |
| 2009/0191453 A1 * | 7/2009 | Fujii | B60L 50/66 429/120 |
| 2011/0052957 A1 * | 3/2011 | Ohta | H01M 50/20 429/99 |
| 2017/0166075 A1 * | 6/2017 | Hong | B60L 50/66 |
| 2018/0056985 A1 * | 3/2018 | Coulter | B60L 50/52 |
| 2019/0288520 A1 * | 9/2019 | Abdel-Monem | G01R 31/392 |
| 2019/0319321 A1 * | 10/2019 | Wang | H02J 7/007 |
| 2020/0144603 A1 * | 5/2020 | Si | H01M 10/052 |
| 2020/0161707 A1 * | 5/2020 | Kawasumi | H01M 10/052 |

* cited by examiner

CONTROL DEVICE FOR VEHICULAR POWER STORAGE UNIT AND VEHICULAR POWER STORAGE DEVICE

CROSS-REFERENCE TO RELATED APPLICATIONS

This application is the U.S. national stage of PCT/JP2017/032889 filed Sep. 12, 2017, which claims priority of Japanese Patent Application No. JP 2016-185549 filed Sep. 23, 2016.

TECHNICAL FIELD

The present disclosure relates to a control device for a vehicular power storage unit and a vehicular power storage device.

BACKGROUND

Power storage units such as electrical double-layer capacitors are known to experience a drop in capacitance at low temperatures. Problems such as a drop in usable power arise when the capacitance drops at low temperatures, and thus some sort of countermeasure is required. For example, with the technique of Japanese Patent No. 3874366, when the internal resistance of a capacitor has risen, that capacitor repeatedly charges and discharges with another capacitor. This charging and discharging causes internal resistors within the capacitor to produce heat, which raises the capacitor temperature.

However, a method that monitors the internal resistance of the power storage unit and then charges and discharges between multiple power storage units when the internal resistance increases, as with the technique disclosed in Japanese Patent No. 3874366, requires that a dedicated charging/discharging control circuit for implementing the charging and discharging between the power storage units be provided separate from the circuitry for charging or discharging the power storage unit from the exterior. Providing such a dedicated charging/discharging control circuit may increase the scale of the circuit and therefore increase the size of the configuration.

Having been achieved in light of the above-described circumstances, an object of the present disclosure is to provide a control device or a power storage device that makes it easy to efficiently increase the temperature of a vehicular power storage unit, while suppressing an increase in the size of the configuration.

SUMMARY

A control device for a vehicular power storage unit according to one example of the present disclosure includes: a holding unit that holds the vehicular power storage unit; a board unit disposed with one board surface arranged on a side where the holding unit is located; a circuit unit that carries out at least one of charging operations of supplying charging current to the power storage unit and discharge operations of supplying discharge current from the power storage unit; and a heat-emitting component mounted on the one board surface of the board unit and disposed in a region between the board unit and the power storage unit, wherein current flows in the heat-emitting component in response to the circuit unit performing predetermined charging operations or predetermined discharge operations, and the heat-emitting component emits heat at least toward the holding unit.

Advantageous Effects of Disclosure

In the above-described control device, the heat-emitting component is mounted on the board unit. The heat-emitting component is configured so that current flows therein when the circuit unit performs predetermined charging operations or predetermined discharge operations, and so that heat is emitted at least toward the holding unit. Accordingly, this control device can raise the temperature of the power storage unit as a result of the heat produced by the heat-emitting component during the charging or discharging of the power storage unit being transmitted to the power storage unit held by the holding unit. Moreover, that heat-emitting component is mounted to the one board surface of the board unit and is disposed in a region between the board unit and the power storage unit, which makes it easy for the heat produced by the heat-emitting component to be efficiently transmitted to the power storage unit, and makes it possible to further improve the effect of raising the temperature of the power storage unit.

DETAILED DESCRIPTION OF PREFERRED EMBODIMENTS

Figure 1:
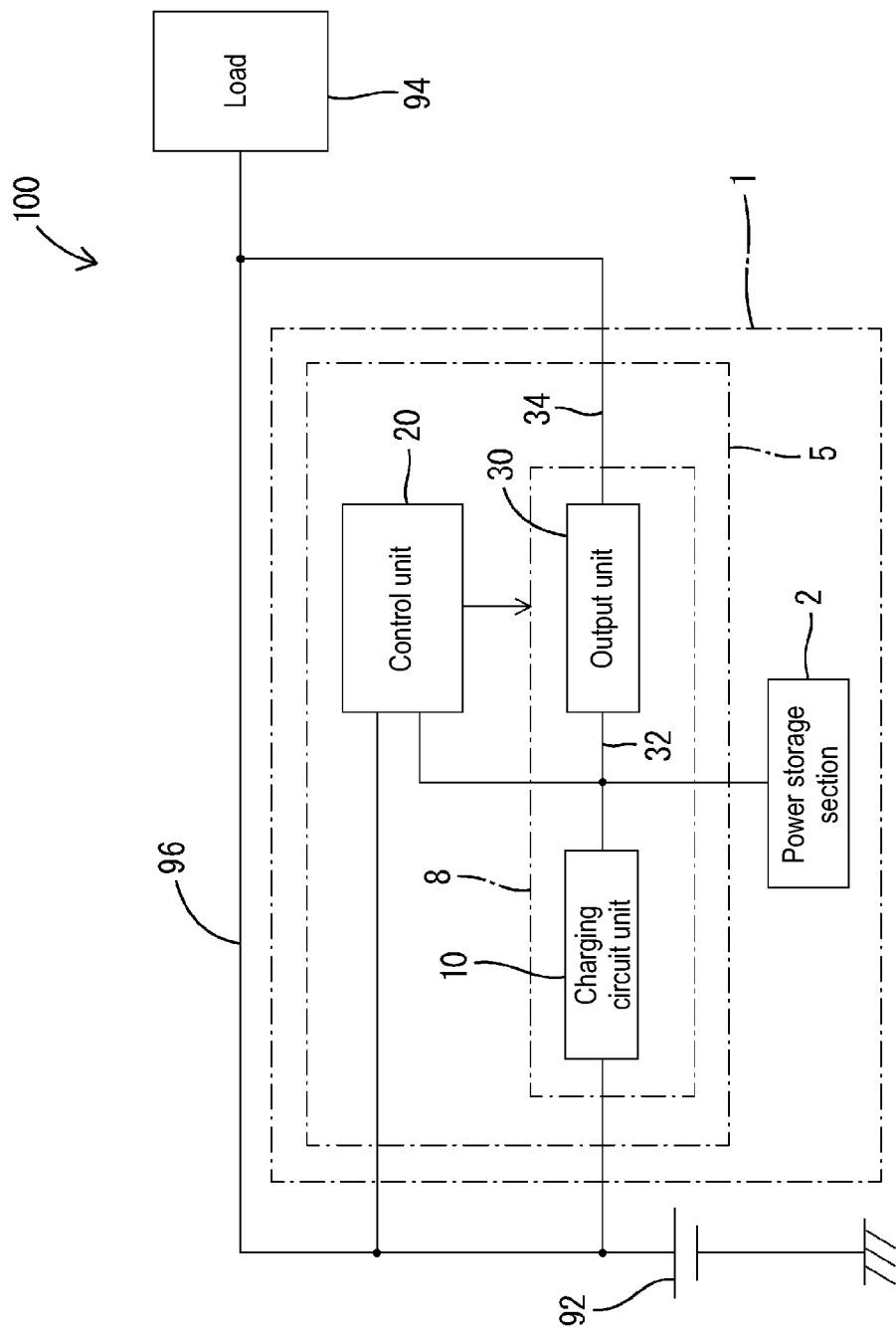
FIG. 1 is a block diagram illustrating an example of a vehicular power source system including a vehicular power storage device according to a first embodiment.

Preferred examples of the present disclosure will be described here. However, the present disclosure is not limited to the following examples.

One feature of the present disclosure is that the heat-emitting component is disposed in a region between the board unit and the power storage unit, but the configuration for disposing the heat-emitting component may be any of the following: a configuration in which the heat-emitting component contacts the power storage unit directly; a configuration in which the heat-emitting component contacts another member and that other member contacts the power storage unit (i.e., a configuration where the heat-emitting component contacts the power storage unit indirectly through the other member); and a configuration in which the heat-emitting component faces the power storage unit without contacting the power storage unit. The configuration in which the heat-emitting component faces the power storage unit without contacting the power storage unit may be a configuration in which another member is not interposed between the heat-emitting component and the power storage unit, or a configuration in which another member is interposed between the heat-emitting component and the power storage unit. When another member is interposed between the heat-emitting component and the power storage unit, that other member may or may not be in contact with the power storage unit, and may or may not be in contact with the heat-emitting component.

A control device for a vehicular power storage unit according to one example of the present disclosure may include a control unit that controls at least the charging operations performed by the circuit unit. The circuit unit may include a charging circuit unit, the charging circuit unit including a charging path serving as a path in which charging current based on power from a vehicular power source unit flows to the power storage unit, a charging path resistance unit provided in the charging path and emitting heat in response to charging current flowing in the charging path, and a charging path switching unit that switches the charging path between a state in which charging current flows and a state in which charging current does not flow. At least the charging path resistance unit may function as the heat-emitting component. The control unit may have a function for controlling the charging operations performed by the charging circuit unit by controlling at least switching operations performed by the charging path switching unit.

When the charging circuit unit supplies charging current to the power storage unit, the control device configured in this manner causes the resistance unit provided in the charging path (the charging path resistance unit) to function as the heat-emitting component, and can therefore efficiently raise the temperature of the power storage unit by using the heat produced by the charging path resistance unit.

The circuit unit may include a second charging circuit unit, the second charging circuit unit including a second charging path configured as a path in which charging current based on power from the vehicular power source unit flows to the power storage unit and configured as a path different from the charging path, a second resistance unit provided in the second charging path and disposed in a position distanced from a space between the board unit and the power storage unit, and a second switching unit that switches the second charging path between a state in which charging current flows and the state in which charging current does not flow. The control unit may be configured to control the charging operations performed by the charging circuit unit and the second charging circuit unit by controlling at least the switching operations performed by the charging path switching unit and the second switching unit.

The control device configured in this manner includes both a circuit (the charging circuit unit) that supplies charging current via the resistance unit (the charging path resistance unit) provided between the board unit and the power storage unit, and a circuit (the second charging circuit unit) that supplies charging current via the resistance unit (the second resistance unit) disposed in positions distanced from the space between the board unit and the power storage units, and is capable of controlling the charging operations of both. The charging circuit unit enables charging operations in which heat produced by the resistance unit (the charging path resistance unit) is easily transmitted to the power storage unit, whereas the second charging circuit unit enables charging operations in which heat produced by the resistance unit (the second resistance unit) is not easily transmitted to the power storage unit.

A control device for a vehicular power storage unit according to one example of the present disclosure may include a temperature detection unit that detects a temperature of the power storage unit. The control unit may have a function for, when the power storage unit is charged while the temperature detected by the temperature detection unit is greater than or equal to a predetermined value, controlling the switching operations performed by the charging path switching unit and the second switching unit so that charging current does not flow in the charging circuit unit and charging current flows in the second charging circuit unit.

With the control device configured in this manner, when the power storage unit is to be charged while the temperature of the power storage unit is relatively high, the charging current can be supplied by the second charging circuit unit, in a state where heat is not easily transmitted to the power storage unit, while suppressing heat emission from the resistance unit (the charging path resistance unit). Thus a situation where, when the temperature of the power storage unit has risen to a given level, the temperature of the power storage unit rises excessively due to the effects of heat emission during charging can be suppressed.

A control device for a vehicular power storage unit according to one example of the present disclosure may include a control unit that controls at least the discharge operations performed by the circuit unit. The circuit unit may include a discharge circuit unit, the discharge circuit unit including a discharge path electrically connected to the power storage unit and serving as a path for the discharge current from the power storage unit, a discharge path resistance unit provided in the discharge path and emitting heat in response to the discharge current flowing in the discharge path, and a discharge path switching unit that switches the discharge path between a state in which the discharge current from the power storage unit flows and a state in which the discharge current from the power storage unit does not flow. The control unit may have a function for controlling the discharge operations performed by the discharge circuit unit by controlling at least switching operations performed by the discharge path switching unit.

The control device configured in this manner causes the resistance unit (the discharge path resistance unit) provided in the discharge path to function as the heat-emitting component when the discharge circuit unit is operated and the discharge current flows from the power storage unit, and can therefore efficiently raise the temperature of the power storage unit by using the heat produced by the discharge path resistance unit.

The circuit unit may include a discharge circuit unit, the discharge circuit unit including a discharge path electrically connected to the power storage unit and serving as a path for the discharge current from the power storage unit, a discharge path resistance unit provided in the discharge path and emitting heat in response to the discharge current flowing in the discharge path, and a discharge path switching unit that switches the discharge path between a state in which the discharge current from the power storage unit flows and a state in which the discharge current from the power storage unit does not flow; and in this configuration, the control unit may have a function for repeating control of the discharge operations performed by the discharge circuit unit by controlling at least the switching operations performed by the discharge path switching unit, and when a predetermined condition is satisfied, repeating control for causing the discharge circuit unit to perform the discharge operations so that the discharge current flows in the discharge path, and control for causing the discharge circuit unit to perform the charging operations so that the charging current flows in the charging path.

With the control device configured in this manner, the resistance unit can be caused to generate heat, and that heat can be transmitted to the power storage unit, both when the charging current is flowing and when the discharge current is flowing. Thus by repeating the discharge operations and the charging operations, this heat transmission can be continued over a longer period of time.

When the predetermined condition is satisfied, the control unit may repeat control for causing the discharge circuit unit to perform the discharge operations so that the discharge current flows in the discharge path within a voltage range where an output voltage of the power storage unit is greater than or equal to a predetermined voltage, and control for causing the charging circuit unit to perform the charging operations so that the charging current flows in the charging path, in an alternating manner.

With the control device configured in this manner, heat transmission to the power storage unit can be continued for a longer period of time. Moreover, while continuing this heat transmission, discharge operations are carried out within the voltage range where the output voltage of the power storage unit is greater than or equal to the predetermined voltage, and thus output greater than or equal to the predetermined voltage can be supplied quickly even if a situation in which power should be supplied from the power storage unit has arisen while repeating the charging/discharging for transmitting the heat.

The holding unit may be configured to fix the power storage unit and the board unit with the one board surface of the board unit facing an outer peripheral side of the power storage unit. The heat-emitting component maybe disposed in a region between an outer circumferential part of the power storage unit and the board unit.

With the control device configured in this manner, the power storage unit and the board unit can be fixed as a single unit by the holding unit, and thus the power storage unit can be efficiently warmed by the heat-emitting component while efficiently using the mounting surface covered by the power storage unit as a region for disposing the heat-emitting component in the integrated unit.

The holding unit may include a support part that is disposed in a region between the one board surface of the board unit and an outer circumferential part of the power storage unit, and that supports the outer circumferential part of the power storage unit. An opening passing from a power storage unit side surface to a board unit side surface of the support part maybe formed in the support part. The heat-emitting component may be disposed in at least one of a position facing an open region of the opening and a position inserted into the opening.

With the control device configured in this manner, the power storage unit and the board unit can be stably fixed by the holding unit while stably supporting the outer circumferential part of the power storage unit with the support part, which is disposed between the one board surface of the board unit and the outer circumferential part of the power storage unit. Furthermore, the opening is formed in the support part, and the heat-emitting component is disposed in at least one of a position facing an open region of the opening and a position inserted into the opening, which makes it possible to prevent heat attempting to move from the heat-emitting component toward the power storage unit from being blocked by the support part. This makes it possible to efficiently transmit heat from the heat-emitting component mounted on the board unit to the power storage unit while improving the stability at which the power storage unit is fixed.

A heat transfer member that makes contact with the heat-emitting component and the power storage unit may be provided in a region between the heat-emitting component and the power storage unit.

With the control device configured in this manner, the heat produced by the heat-emitting component can be efficiently transmitted to the power storage unit by the heat transfer member, which contacts the heat-emitting component and the power storage unit, and this makes it possible to raise the temperature of the power storage unit even more effectively.

The power storage unit may be disposed extending in a predetermined direction along the one board surface. Additionally, a plurality of the heat-emitting components arranged in the predetermined direction may be disposed facing the power storage unit.

With the control device configured in this manner, heat produced by the plurality of heat-emitting components can be efficiently transmitted to the power storage unit, and thus the temperature of the power storage unit can be more effectively raised by more efficiently using the heat produced by the plurality of heat-emitting components.

A vehicular power storage device may be configured including the control device for a vehicular power storage unit having any one of the above-described configurations and a power storage section including one or more power storage units.

According to this configuration, a vehicular power storage device that can achieve the same effects as the above-described control devices for a vehicular power storage unit can be realized in a form including the power storage unit.

First Embodiment

A first embodiment of the present disclosure will be described hereinafter.

A vehicular power source system 100 (also called a "system 100" hereinafter) illustrated in FIG. 1 includes a battery 92 serving as a main power source and a power storage device 1 having a power storage section 2 functioning as a supplementary power source, and is configured as a power source system that supplies power to a load 94 (a subject for backup). The system 100 is configured as a system that supplies power from the battery 92 to the load 94 when the power supply from the battery 92 is in a normal state, and supplies power from the power storage section 2 to the load 94 when the power supply from the battery 92 is in an abnormal state.

"When the power supply from the battery 92 is in a normal state" is a state where a predetermined amount or more of power can be supplied from the battery 92 to the load 94, and "when the power supply from the battery 92 is in an abnormal state" is a state where the predetermined amount or more of power is not supplied from the battery 92 to the load 94. The following will describe an example in which a case where the potential at a predetermined position of a power line 96 provided between the battery 92 and the load 94 is greater than or equal to a set value when discharge operations of an output unit 30 are stopped corresponds to "when the power supply from the battery 92 is in a normal state", and a case where the potential at the predetermined position of the power line 96 is less than the set value corresponds to "when the power supply from the battery 92 is in an abnormal state".

The battery 92 is configured as a known type of vehicular battery, such as a lead battery, for example. A high-potential side terminal of the battery 92 is electrically connected to the power line 96, and the battery 92 applies an output voltage having a predetermined value (e.g., 12 V) to the power line 96. Note that fuses, switches, and the like, which are not shown, are provided midway along the power line 96. The battery 92 is also electrically connected to a generator (not shown), and can be charged by power from the generator.

The load 94 is configured as a known vehicular electrical component. An electrical component for which it is desirable that power continues to be supplied even if the power supply from the battery 92 has been cut off, such as an ECU or an actuator in a shift-by-wire system, an ECU or an actuator in an electronically-controlled braking system, or the like, is a favorable example of the load 94, but a different vehicular electrical component may be applied instead. The load 94 operates on the basis of power supplied from the battery 92 during the above-described normal state, and operates on the basis of power supplied from the power storage section 2 during the above-described abnormal state.

Figure 2:
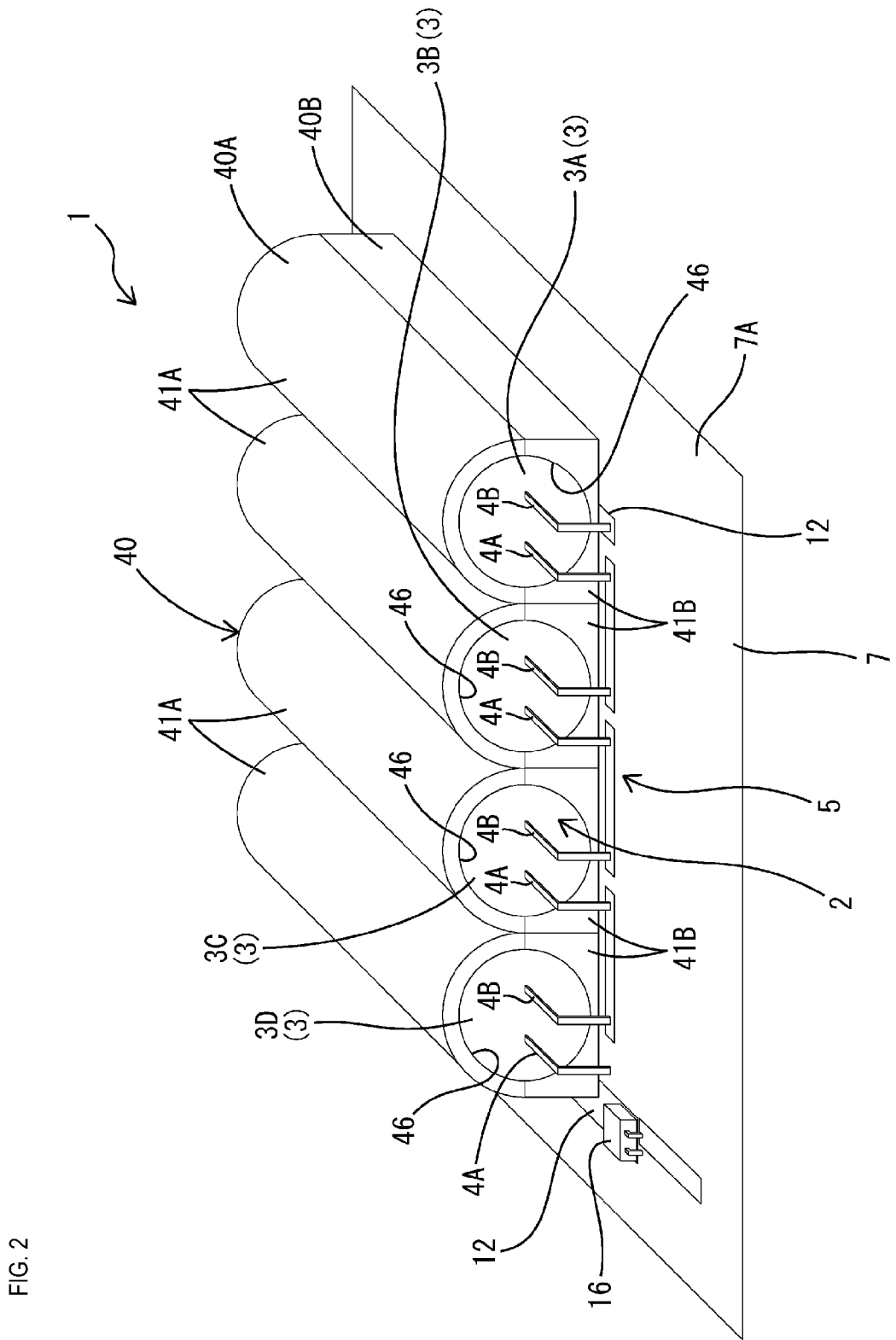
FIG. 2 is a perspective view illustrating the external appearance of the vehicular power storage device according to the first embodiment in a simplified manner.

The power storage device 1 has an external appearance such as that illustrated in FIG. 2, for example, and primarily includes the power storage section 2 and a control device 5 that can control the charging/discharging of the power storage section 2, with these elements being configured in an integrated manner. In the example illustrated in FIG. 2 and the like, the parts of the power storage device 1 excluding a plurality of power storage units 3 correspond to the control device 5.

The power storage section 2 is configured as a power storage unit group including a plurality of vehicular power storage units 3 (also called "power storage units 3" hereinafter). The power storage units 3 are configured as known power storage means such as electrical double-layer capacitors, for example, and the power storage section 2 functions as a capacitor unit that produces a desired output using the plurality of capacitors. In the example illustrated in FIGS. 2 and 3, the power storage section 2 is configured with the plurality of power storage units 3 connected in series, with the terminal at the lowest potential in terms of the power storage section 2 as a whole being connected to a ground, and that terminal being kept at a predetermined low potential (0 V). Meanwhile, the terminal at the highest potential in terms of the power storage section 2 as a whole is electrically connected to an input path (conductive path 32) to the output unit 30, and a voltage based on a charge amount of the power storage section 2 is applied to that terminal.

Figure 3:
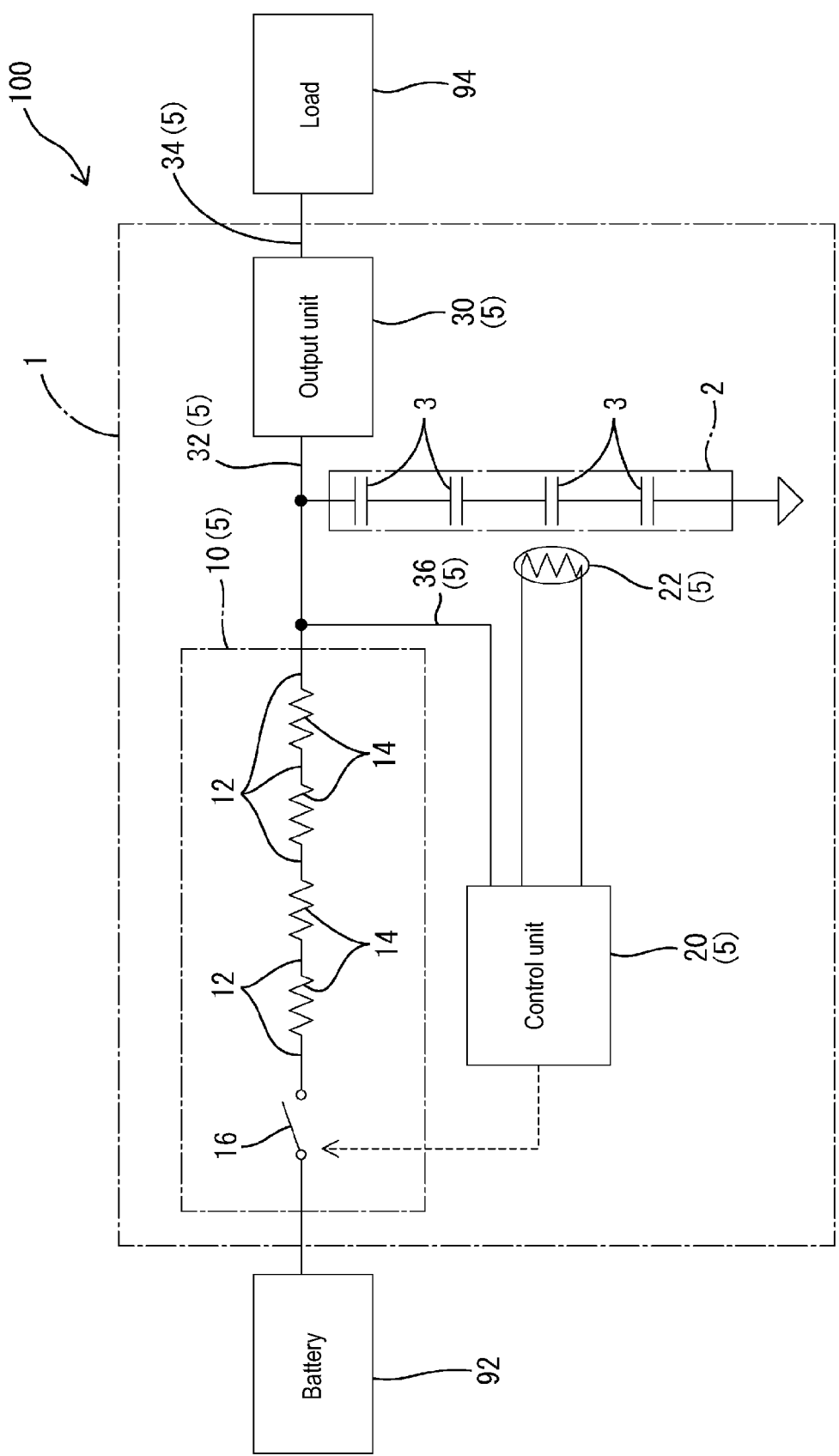
FIG. 3 is a circuit diagram illustrating the vehicular power source system of FIG. 1 in detail.
Figure 4:
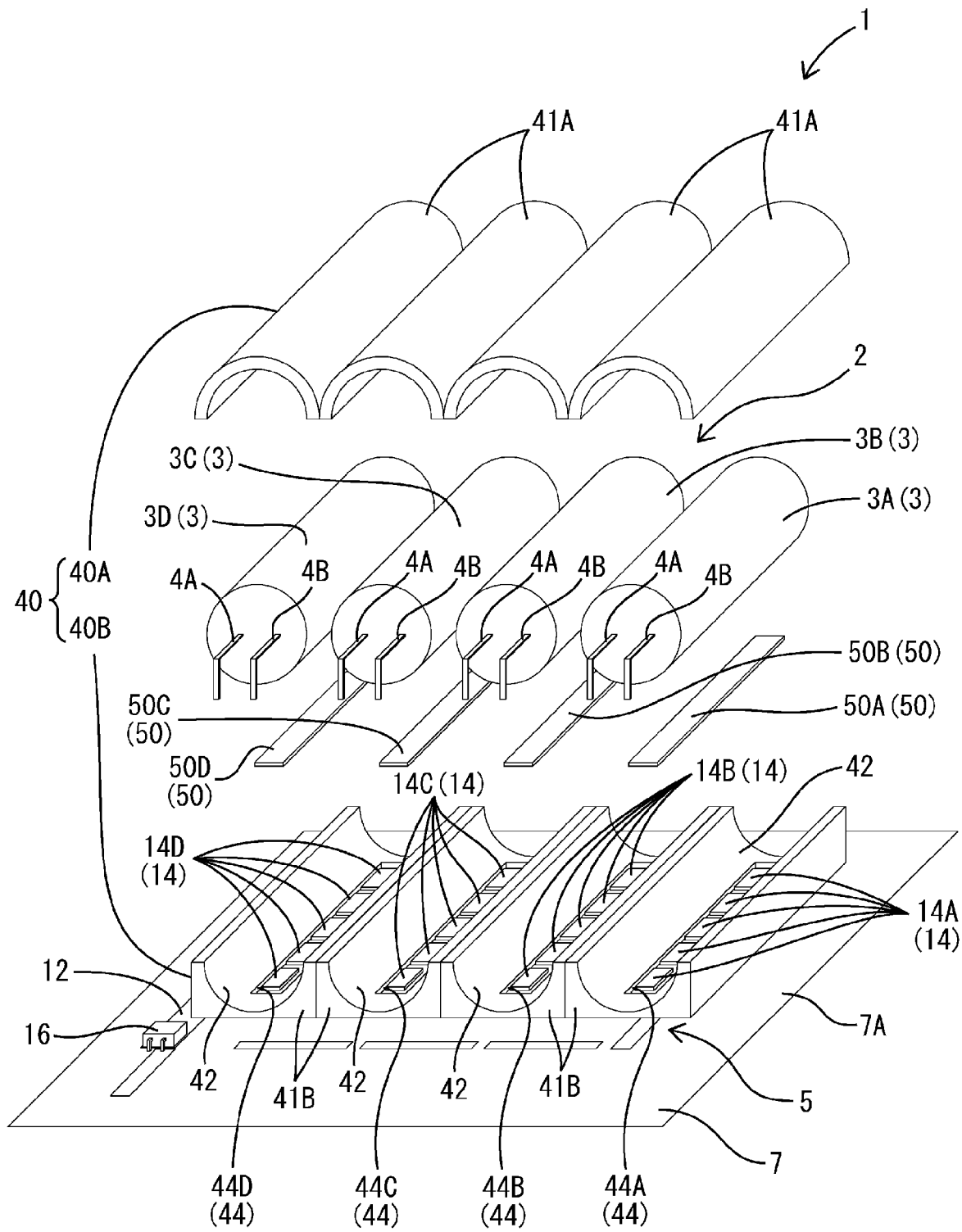
FIG. 4 is an exploded perspective view illustrating the vehicular power storage device of the first embodiment in an exploded state.

As illustrated in FIG. 4, each power storage unit 3 is shaped as a cylinder that extends along a predetermined axial direction. A pair of electrode parts 4A and 4B is provided at one end of the power storage unit 3 in the lengthwise direction (the axial direction). The electrode parts 4A and 4B extend from the end of the power storage unit 3, and leading ends of the electrode parts 4A and 4B are fixed to one surface of a board unit 7 (a board surface 7A). As illustrated in FIG. 2, the plurality of power storage units 3 are arranged in a predetermined first direction along the board surface 7A of the board unit 7, and the power storage units 3 are arranged parallel to each other while extending in a second direction orthogonal to the first direction. The first direction (the direction in which the power storage units 3 are arranged) is a predetermined direction parallel to the board surface 7A, and the second direction (the direction which the power storage units 3 extend) is a direction both parallel to the board surface 7A and orthogonal to the first direction. With the plurality of power storage units 3 arranged in this manner, the terminals of adjacent power storage units 3 are electrically connected to each other by interconnect parts formed on the board surface 7A of the board unit 7, thus providing a serial connection as illustrated in FIG. 3. A high-potential side terminal, where the potential is the highest, of the power storage section 2 configured in this manner is electrically connected to the conductive path 32 of a charging/discharging unit 8, which will be described later, and charging or discharging is carried out by this charging/discharging unit 8.

In the following descriptions, a thickness direction of the board unit 7 is assumed to be a vertical direction, and of the directions orthogonal to the vertical direction, the direction in which the power storage units 3 extend (the second direction) is assumed to be a depth direction. A direction orthogonal to both the vertical direction and the depth direction (the first direction in which the plurality of power storage units 3 are arranged) is assumed to be a horizontal direction. Using the board unit 7 as a reference, the side on which the power storage units 3 are arranged is assumed to be the top, and the side opposite therefrom is assumed to be the bottom.

The control device 5 illustrated in FIGS. 1 and 2 includes the board unit 7, a holding unit 40, the charging/discharging unit 8, a control unit 20, and so on, and is configured as a device that is capable of controlling the charging and discharging of the power storage section 2.

As illustrated in FIG. 2, the board unit 7 is a board-shaped body on a surface part of which various components are mounted, and includes one or more insulation layers, and a conductive layer formed on a surface part and/or within the insulation layers. The board unit 7 is configured as a known printed circuit board, for example, and the power storage device 1 is configured by mounting various types of components onto the board unit 7 as illustrated in FIG. 2. The one board surface 7A of the board unit 7 is provided on the power storage unit 3 side, and is kept at a predetermined distance from the power storage units 3. The holding unit 40 is fixed to the one board surface 7A of the board unit 7, and the plurality of power storage units 3 are fixed by being held by the holding unit 40.

The control unit 20 illustrated in FIGS. 1 and 3 is configured as a microcomputer, for example, and includes a computation unit such as a CPU, memory such as ROM, RAM, or the like, an AD converter, and so on. The control unit 20 is configured to be capable of detecting a voltage at a predetermined position of the power line 96. The control unit 20 has a function for controlling a charging circuit unit 10 and the output unit 30, and in the example illustrated in FIG. 3, has a function for controlling the on action and off action of a switching unit 16, which will be described later, and a function for controlling discharge operations and discharge stop operations of the output unit 30, which will be described later. The control unit 20 corresponds to an example of a control unit, and controls charging operations of the charging circuit unit 10 by controlling switching operations of the switching unit 16. Additionally, in the example illustrated in FIG. 3, a voltage signal indicating an output voltage of the power storage section 2 (the potential at the terminal where the potential becomes the highest (the terminal connected to the conductive path 32)) is input to the control unit 20 via a signal line 36, and the control unit 20 is capable of detecting the output voltage of the power storage section 2.

As illustrated in FIG. 1, the charging/discharging unit 8 includes the charging circuit unit 10 and the output unit 30, and is capable of charging operations for charging the power storage section 2, using the charging circuit unit 10, on the basis of power from the battery 92, and discharge operations for discharging the power storage section 2 using the output unit 30. The charging operations by the charging circuit unit 10 are controlled by the control unit 20, and the discharge operations by the output unit 30 are also controlled by the control unit 20.

The charging circuit unit 10 illustrated in FIG. 3 corresponds to one example of a circuit unit, and is capable of charging operations for supplying charging current to the power storage units 3. The charging circuit unit 10 includes a charging path 12, a plurality of resistance units 14, and the switching unit 16, and is configured with the switching unit 16 and the plurality of resistance units 14 connected in series by an interconnect part (the charging path 12).

The charging path 12 is a conductive path serving as a path along which the charging current flows between the battery 92, which functions as a main power source unit, and the plurality of power storage units 3 (the power storage section 2), which function as a supplementary power source unit. The charging path 12 is configured as a copper foil pattern or the like arranged on the board surface 7A of the board unit 7.

The plurality of resistance units 14 are configured as known resistors, and function as charging path resistance units that are provided in the charging path 12 and that emit heat in response to charging current flowing in the charging path 12. Each of the resistance units 14 corresponds to an example of a heat-emitting component, and functions as a current limiting resistor that limits the charging current. As illustrated in FIG. 4, the resistance units 14 are mounted on the one board surface 7A of the board unit 7, and are arranged in a region between the board unit 7 and the power storage units 3, so that power is supplied from the battery 92 in accordance with the charging circuit unit 10 carrying out predetermined charging operations (operations for putting the switching unit 16 in an on state) and the charging current flows to the power storage units 3 due to this power. The resistance units 14 function so that heat is emitted at least toward the power storage units 3 (upward) when the charging current flows in accordance with the switching unit 16 being turned on.

The switching unit 16 illustrated in FIG. 3 is constituted by a semiconductor switch such as a MOSFET or a bipolar transistor, as a mechanical relay, or the like, for example, and is configured to switch to an on state or an off state in accordance with a control signal from the control unit 20. When the switching unit 16 is in an on state, the charging path 12 is in a state where the charging current is flowing, and when the switching unit 16 is in an off state, the charging path 12 is in a state where the charging current is not flowing. Note that the following will describe, as a representative example, a configuration in which the switching unit 16 is constituted by a MOSFET, an energized state is realized when the switch turns on so that current flows from the battery 92 side toward the power storage unit 3 side, and a cutoff state is realized when the switch turns off so that no current flows from the battery 92 side toward the power storage unit 3 side.

In the charging circuit unit 10 configured in this manner, the switching unit 16 turns on when an on signal (a signal instructing the switching unit 16 to turn on) is supplied to the switching unit 16 from the control unit 20, and the charging operations (operations for supplying the charging current from the battery 92 toward the power storage section 2 side) are carried out. During these charging operations, the plurality of resistance units 14 emit heat, and that heat is transmitted to the power storage units 3 arranged near the resistance units 14. In other words, the power storage units 3 are warmed by the heat from the resistance units 14 produced during the charging operations. On the other hand, when charging is stopped, no heat produced by the charging current is emitted from the plurality of resistance units 14, and thus the heating of the power storage units 3 is suppressed.

The output unit 30 illustrated in FIGS. 1 and 3 is capable of the discharge operations, in which the power storage section 2 discharges, and stopping operations for stopping the discharge of the power storage section 2. The output unit 30 may have any configuration that enables the area between the conductive path 32 and a conductive path 34 to be switched between a conductive state and a non-conductive state. The output unit 30 can be constituted by a switching element such as a MOSFET (not illustrated) interposed between the conductive path 32 and the conductive path 34, for example, and in this case, when the switching element is turned on, the conductive path 32 and the conductive path 34 enter a conductive state, and discharge current from the power storage section 2 is supplied to the load 94. On the other hand, when the switching element is turned off, the conductive path 32 and the conductive path 34 enter the non-conductive state, and the discharge operations from the power storage section 2 are stopped.

A temperature sensor 22 illustrated in FIG. 3 is configured as a thermistor, for example, and is disposed at a position close to any one of the power storage units 3 constituting the power storage section 2. For example, the temperature sensor 22 may be mounted on the board surface 7A of the board unit 7 so as to face the power storage units 3, or may be fixed to the holding unit 40 or the power storage units 3. The temperature sensor 22 may be in contact with an outer surface part of the power storage units 3 or may be in contact with a member (e.g., a heat transfer member) in contact with an outer surface part of the power storage units 3. Alternatively, the temperature sensor 22 may be near the power storage units 3, with a gap provided between the temperature sensor 22 and an outer surface part of the power storage units 3. Regardless of the arrangement, the temperature sensor 22 detects a temperature at the position where it is disposed and supplies a detection value indicating the temperature at the position where the temperature sensor 22 is disposed to the control unit 20. The control unit 20 finds the temperature at the position where the temperature sensor 22 is disposed (that is, the temperature of the power storage units 3) on the basis of the detection value supplied from the temperature sensor 22.

The holding unit 40 illustrated in FIGS. 2 and 4 is a member that holds the power storage units 3, and functions as a fixing member for fixing the plurality of power storage units 3 to the board unit 7. The holding unit 40 is configured to fix the power storage units 3 and the board unit 7 in a state where the one board surface 7A of the board unit 7 faces an outer peripheral side of the power storage units 3. As illustrated in FIG. 2, the holding unit 40 is configured as a case body (a holding body) that holds the plurality of power storage units 3 while covering the plurality of power storage portions 3, and includes a lower case part 40B placed upon and fixed to the board surface 7A of the board unit 7, and an upper case part 40A fixed to the lower case part 40B from above. The plurality of power storage units 3 are fixed within the holding unit 40 in a state interposed between the upper case part 40A and the lower case part 40B. As illustrated in FIG. 4, a plurality of hole portions 46 extending in the depth direction are formed in the holding unit 40 arranged side-by-side horizontally, and the power storage units 3 are held in a state in which the respective power storage units 3 are accommodated within the hole portions 46. Individual lower case portions 41B, each holding the lower side of a corresponding power storage unit 3, are formed in the lower case part 40B, and individual upper case portions 41A, each covering the upper side of a corresponding power storage unit 3, are formed in the upper case part 40A.

As illustrated in FIG. 4, of the inner circumferential parts of the hole portions 46 (FIG. 2) in the holding unit 40, the inner circumferential parts on the lower case part 40B side are configured as support parts 42. The support parts 42 are disposed between the one board surface 7A of the board unit 7 and the outer circumferential parts of corresponding power storage units 3, and are configured to support the outer circumferential parts of the power storage units 3 from below. The support parts 42 make contact with and support the outer circumferential surfaces of the power storage units 3 so that the power storage units 3 are disposed extending in a predetermined direction (the depth direction) along the one board surface 7A. In the example illustrated in FIG. 4, the inner circumferential surfaces of the support parts 42 are configured as semi-cylindrical curved surfaces, and are configured to make contact with the outer circumferential surfaces of the power storage units 3, which are configured having cylindrical surfaces.

As illustrated in FIG. 4, openings 44 passing from the power storage unit 3 side surfaces of the support parts 42 (the surface of the lower case part 40B that makes contact with the board surface 7A (the lower surface)) to the board unit 7 side surfaces (i.e., the inner circumferential surfaces in contact with the power storage units 3) are formed in the support parts 42. Each opening 44 formed in a support part 42 is arranged facing the corresponding power storage unit 3 at a bottom position of the power storage unit 3, and is configured as a rectangular long hole that is longer in the direction in which the power storage units 3 extend (i.e., the depth direction).

As illustrated in FIG. 4, the resistance units 14 functioning as heat-emitting components are disposed between the outer circumferential parts of the power storage units 3 and the board unit 7. In the example illustrated in FIG. 4, a plurality of the resistance units 14 are arranged in a predetermined direction (the depth direction) in the position of the corresponding opening 44 formed in the corresponding support part 42, with all of the resistance units 14 arranged so as to be at least partially inserted into the openings 44 and facing the power storage units 3. In the example illustrated in FIG. 4, the plurality of resistance units 14 are constituted by a first charging resistor group, which is constituted by first resistors 14A, a second charging resistor group, which is constituted by second resistors 14B, a third charging resistor group, which is constituted by third resistors 14C, and a fourth charging resistor group, which is constituted by fourth resistors 14D.

The first resistors 14A constituting the first charging resistor group are mounted on the board surface 7A and connected in series while being arranged in the depth direction, and are partially inserted into a first opening 44A, among the plurality of openings 44, so as to face first power storage units 3A. The second resistors 14B constituting the second charging resistor group are mounted on the board surface 7A and connected in series while being arranged in the depth direction, and are partially inserted into a second opening 44B, among the plurality of openings 44, so as to face second power storage units 3B. The third resistors 14C constituting the third charging resistor group are mounted on the board surface 7A and connected in series while being arranged in the depth direction, and are partially inserted into a third opening 44C, among the plurality of openings 44, so as to face third power storage units 3C. The fourth resistors 14D constituting the fourth charging resistor group are mounted on the board surface 7A and connected in series while being arranged in the depth direction, and are partially inserted into a fourth opening 44D, among the plurality of openings 44, so as to face fourth power storage units 3D.

Figure 5:
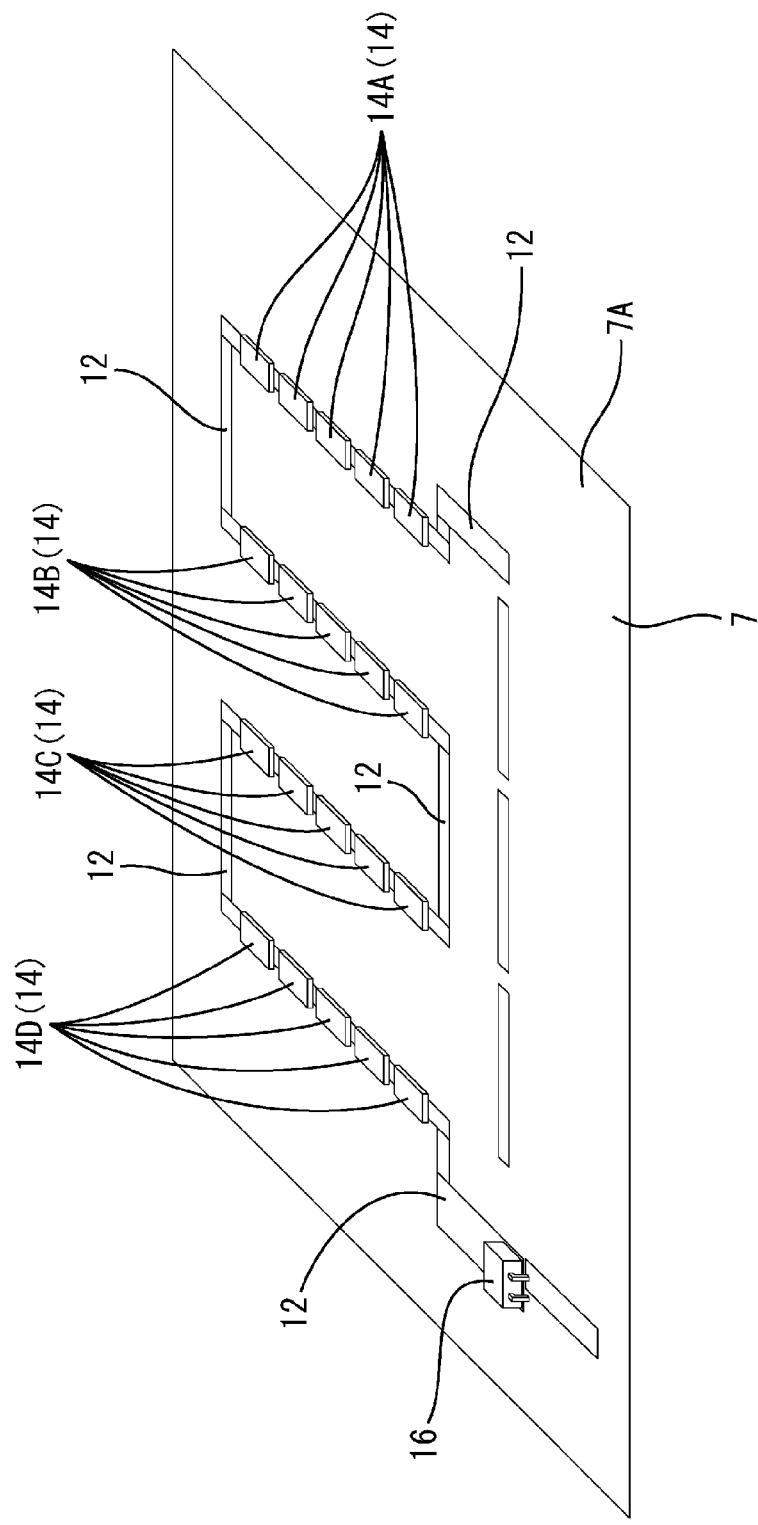
FIG. 5 is a perspective view illustrating the vehicular power storage device according to the first embodiment in a simplified manner, with a holding unit, a power storage section, and so on omitted.

In the example illustrated in FIG. 3, in the charging circuit unit 10, the switching unit 16 and the plurality of resistance units 14 are connected in series, but the number of resistors constituting the resistance units 14 are not particularly limited. In the example illustrated in FIG. 4, a plurality of resistance units 14 connected in series in the charging circuit unit 10 serve as the four charging resistor groups, and are disposed at the bottom positions of the power storage units 3, and as illustrated in FIG. 5, the first charging resistor group, the second charging resistor group, the third charging resistor group, and the fourth charging resistor group are connected in series. Because this configuration is used, charging current flows in all of the charging resistor groups when the switching unit 16 is on, and thus all of the charging resistor groups produce heat. Accordingly, all of the power storage units 3 are heated during the charging operations of the charging circuit unit 10.

A heat transfer member 50 that makes contact with the resistance units 14 and the power storage unit 3 is provided between the resistance units 14 and the power storage unit 3 at the position of each opening 44. Specifically, a first heat transfer member 50A is disposed between the plurality of first resistors 14A constituting the first charging resistor group in the first opening 44A and the first power storage units 3A, so as to be interposed between the plurality of first resistors 14A and the first power storage units 3A. A second heat transfer member 50B is disposed between the plurality of second resistors 14B constituting the second charging resistor group in the second opening 44B and the second power storage units 3B, so as to be interposed between the plurality of second resistors 14B and the second power storage units 3B. A third heat transfer member 50C is disposed between the plurality of third resistors 14C constituting the third charging resistor group in the third opening 44C and the third power storage units 3C, so as to be interposed between the plurality of third resistors 14C and the third power storage units 3C. A fourth heat transfer member 50D is disposed between the plurality of fourth resistors 14D constituting the fourth charging resistor group in the fourth opening 44D and the fourth power storage units 3D, so as to be interposed between the plurality of fourth resistors 14D and the fourth power storage units 3D. Each heat transfer member 50 (the first heat transfer member 50A, the second heat transfer member 50B, the third heat transfer member 50C, and the fourth heat transfer member 50D) is configured having a long plate shape, from a material having a higher thermal conductivity than air, for example, and specifically, a metal material, a resin material, or the like can be used suitably.

With the power storage device 1 configured in this manner, the control unit 20 supplies a charging instruction to the charging circuit unit 10 when a predetermined charging condition is satisfied, and charges the power storage section 2. For example, the control unit 20 turns the switching unit 16 on when the output voltage of the power storage units 3 has become lower than a target voltage (e.g., when the output voltage of the power storage units 3 has become lower than the target voltage, and a difference between the target voltage and the output voltage exceeds a set value), and charges the power storage section 2 until the output voltage of the power storage section 2 reaches the target voltage. Then, the switching unit 16 is turned off when the output voltage of the power storage section 2 has reached the target voltage, and the charging is ended. During such charging operations, the resistance units 14 can be caused to generate heat by supplying the charging current to the resistance units 14, and the power storage units 3 can therefore be warmed, which makes it possible to suppress a drop in the capacitance of the power storage units 3 even in a low-temperature environment.

Note that the target voltage may always be a set value, or may be changed depending on the circumstances. For example, the control unit 20 is capable of acquiring an IG on signal, which indicates that an ignition switch (not shown) provided in the vehicle has turned on, and an IG off signal, which indicates that the ignition switch has turned off, from an external device. When the ignition switch is on, the target voltage is set to a first voltage, and the output voltage of the power storage section 2 is kept near the first voltage. Additionally, when the ignition switch is off, the target voltage is set to a second voltage, which is lower than the first voltage, and the output voltage of the power storage section 2 is kept near the second voltage. Note that the specific configuration of the control unit 20 is not limited as long as the configuration enables the control unit 20 to detect when the ignition switch is on and off.

Examples of the effects of this configuration will be given here.

As illustrated in FIG. 4, in the control device 5, the resistance units 14 (the heat-emitting components) are mounted on the board unit 7. The resistance units 14 (the heat-emitting components) are configured so that current flows in response to predetermined charging operations by the charging circuit unit 10 (the circuit unit), and heat is emitted at least toward the holding unit 40 side (i.e., toward the power storage units 3). Accordingly, the control device 5 can raise the temperature of the power storage units 3 as a result of the heat produced by the resistance units 14 (the heat-emitting components) being transmitted to the power storage units 3 when the power storage units 3 are being charged. Moreover, the resistance units 14 (the heat-emitting components) are mounted on the one board surface 7A of the board unit 7 and disposed in regions between the board unit 7 and the power storage units 3, which makes it easy for the heat produced by the resistance units 14 (the heat-emitting components) to be efficiently transmitted to the power storage units 3 and thus makes it possible to further improve the effect of raising the temperature of the power storage units 3.

The control device 5 includes the control unit 20, which controls at least the charging operations by the charging circuit unit 10 (the circuit unit). The charging circuit unit 10 includes the charging path 12, which serves as a path for supplying the charging current based on the power from the battery 92 (a vehicular power source unit) to the power storage units 3; the resistance units 14 (charging path resistance units, heat-emitting components), which are provided in the charging path 12 and emit heat in response to the charging current flowing in the charging path 12; and the switching unit 16 (a charging path switching unit), which switches the charging path 12 between a state where the charging current flows and a state where the charging current does not flow. At least the resistance units 14 function as heat-emitting components, and the control unit 20 has a function for controlling the charging operations performed by the charging circuit unit 10 by controlling the switching operations of at least the switching unit 16. The control device 5 configured in this manner causes the resistance units 14 (the charging path resistance units) provided in the charging path 12 to function as heat-emitting components when the charging current is supplied to the power storage units 3 by the charging circuit unit 10, and can therefore efficiently raise the temperature of the power storage units 3 by using the heat produced by the resistance units 14.

As illustrated in FIGS. 2 and 4, the holding unit 40 is configured so as to fix the power storage units 3 and the board unit 7 with the one board surface 7A of the board unit 7 facing the outer peripheral sides of the power storage units 3. The resistance units 14 (the heat-emitting components) are disposed in regions between the outer circumferential parts of the power storage units 3 and the board unit 7. With the control device 5 configured in this manner, the power storage units 3 and the board unit 7 can be fixed as a single unit by the holding unit 40, and thus the power storage units 3 can be efficiently warmed by the heat-emitting components while efficiently using the mounting surface covered by the power storage units 3 as regions for disposing the heat-emitting components in the integrated unit.

As illustrated in FIG. 4, the holding unit 40 includes the support parts 42, which are disposed in regions between the one board surface 7A of the board unit 7 and the outer circumferential parts of the power storage units 3, and which support the outer circumferential parts of the power storage units 3. The openings 44 passing from the power storage unit 3 side surfaces of the support parts 42 to the board unit 7 side surfaces are formed in the support parts 42. The resistance units 14 (the heat-emitting components) are disposed in positions such that the resistance units 14 are inserted into the openings 44. With the control device 5 configured in this manner, the power storage units 3 and the board unit 7 can be stably fixed by the holding unit 40 while stably supporting the outer circumferential parts of the power storage units 3 with the support parts 42, which are disposed between the one board surface 7A of the board unit 7 and the outer circumferential parts of the power storage units 3. Furthermore, the openings 44 are formed in the support parts 42, and the resistance units 14 (the heat-emitting components) are disposed in positions in which the resistance units 14 have been inserted into the openings 44, which makes it possible to prevent heat attempting to move from the resistance units 14 (the heat-emitting components) toward the power storage units 3 from being blocked by the support parts 42. This makes it possible to efficiently transmit heat from the heat-emitting components mounted on the board unit 7 to the power storage units 3 while improving the stability at which the power storage units 3 are fixed.

The heat transfer members 50, which contact the resistance units 14 (the heat-emitting components) and the power storage units 3, are provided in regions between the resistance units 14 (the heat-emitting components) and the power storage units 3. With the control device 5 configured in this manner, the heat produced by the resistance units 14 (the heat-emitting components) can be efficiently transmitted to the power storage units 3 by the heat transfer members 50, which contact the resistance units 14 (the heat-emitting components) and the power storage units 3, and this makes it possible to raise the temperature of the power storage units 3 even more effectively.

The power storage units 3 are disposed extending in a predetermined direction (the depth direction) along the one board surface 7A. The plurality of resistance units 14 (the heat-emitting components), which are arranged in a predetermined direction along the corresponding power storage units 3, are disposed facing the corresponding power storage units 3 in the positions of the corresponding openings 44. With the control device 5 configured in this manner, the heat produced by the plurality of resistance units 14 (the heat-emitting components) can be efficiently transmitted to the nearby power storage units 3 at the positions of the corresponding openings 44. Accordingly, the temperature of the power storage units 3 can be more effectively raised by using the heat produced by the plurality of resistance units 14 (the heat-emitting components).

Second Embodiment

A second embodiment will be described next.

Figure 6:
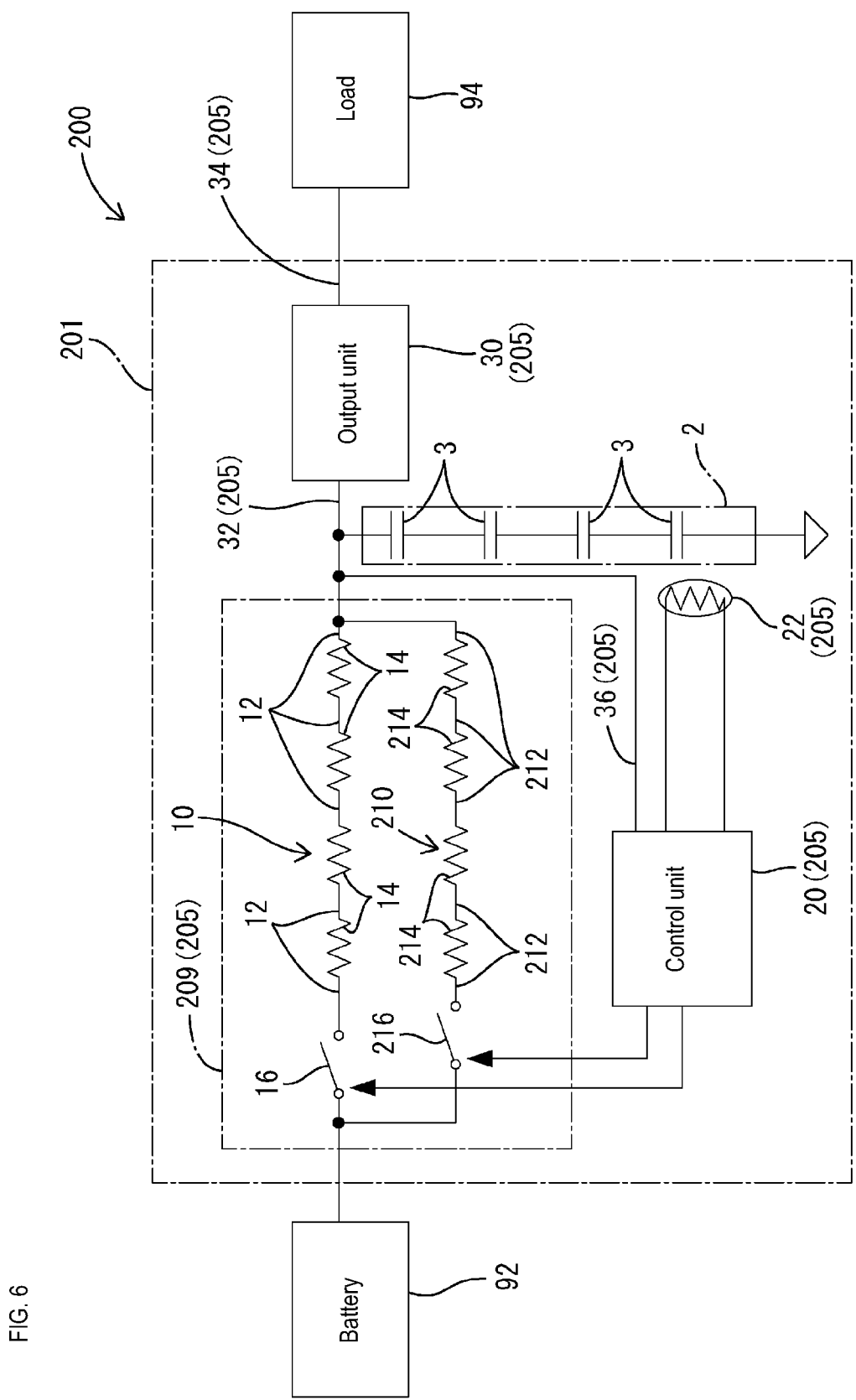
FIG. 6 is a circuit diagram illustrating an overview of a vehicular power source system according to a second embodiment.
Figure 8:
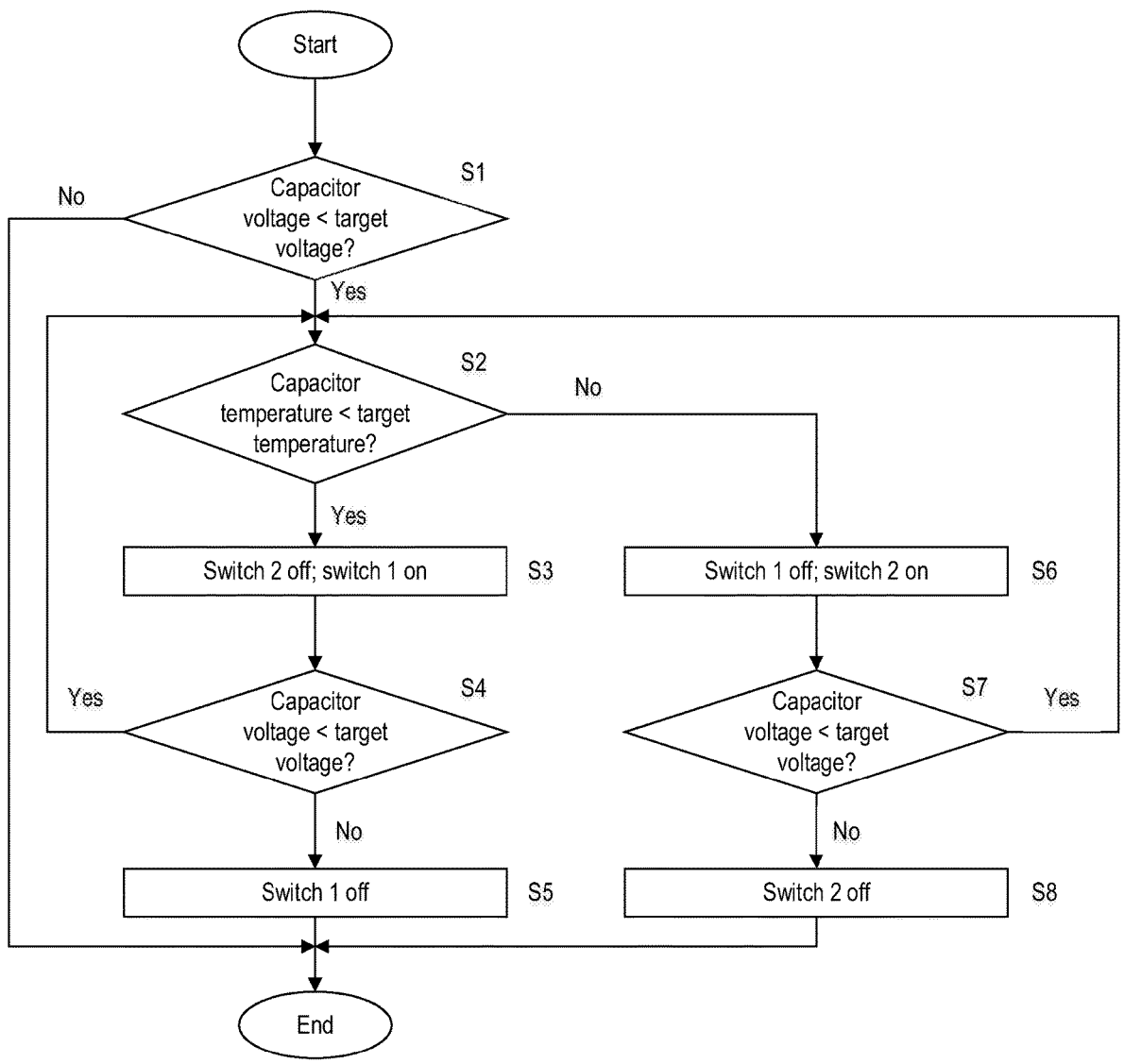
FIG. 8 is a flowchart illustrating an example of the flow of charging control carried out by the vehicular power storage device according to the second embodiment.

A vehicular power source system 200 according to the second embodiment, illustrated in FIG. 6, differs from the vehicular power source system 100 according to the first embodiment only in that a second charging circuit unit 210 is provided in addition to the charging circuit unit 10, and that control such as that illustrated in FIG. 8 is implemented. The parts of the vehicular power source system 200 according to the second embodiment aside from the second charging circuit unit 210 are the same as the parts of the vehicular power source system 100 according to the first embodiment (FIGS. 1, 3, and so on). Parts of the vehicular power source system 200 that are the same as those in the vehicular power source system 100 according to the first embodiment are given the same reference signs as in the vehicular power source system 100, and detailed descriptions thereof will be omitted.

As illustrated in FIG. 6, the vehicular power source system 200 includes the same battery 92 as in the first embodiment and a power storage device 201 (a vehicular power storage device), and is configured as a system that can supply power to the load 94.

Figure 7:
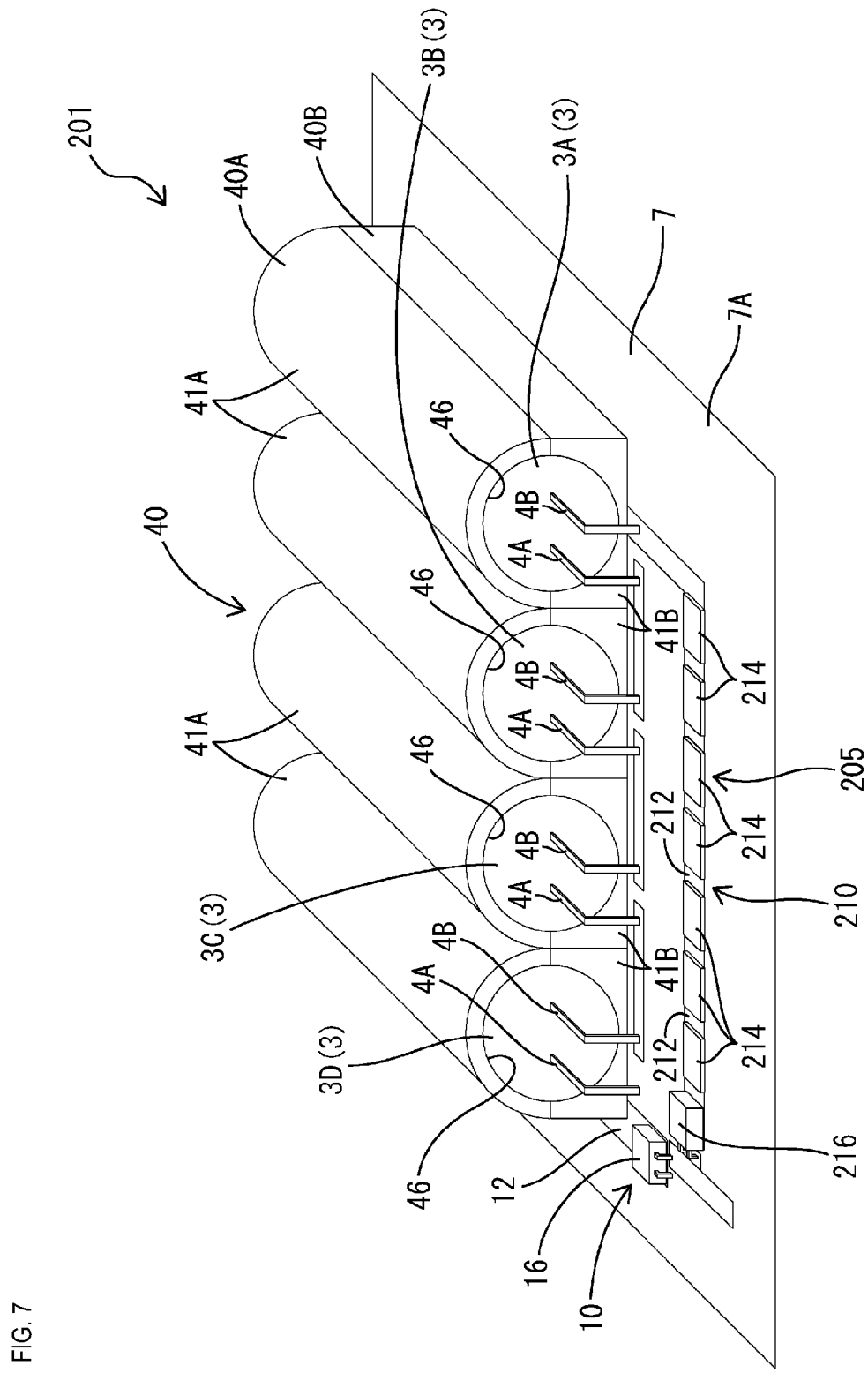
FIG. 7 is a perspective view illustrating the external appearance of the vehicular power storage device according to the second embodiment in a simplified manner.

As illustrated in FIGS. 6 and 7, the power storage device 201 includes the power storage section 2, which is constituted by a plurality of power storage units 3, and a control device 205 (a vehicular power storage unit control device). The power storage section 2 has the same configuration as the power storage section 2 according to the first embodiment, and the same functions. The control device 205 corresponds to the parts of the power storage device 201 illustrated in FIG. 7 excluding the power storage section 2, and has a configuration in which the second charging circuit unit 210 has been added to the control device 5 according to the first embodiment (FIGS. 1, 2, and so on).

As illustrated in FIGS. 6 and 7, the control device 205 includes the holding unit 40, which holds the power storage units 3; the board unit 7, with the one board surface 7A arranged on the power storage unit 3 side; the charging circuit unit 10, which can supply charging current to the power storage units 3; the second charging circuit unit 210, which is constituted by a current path different from the charging circuit unit 10; the output unit 30; and the control unit 20, which can control the charging circuit unit 10, the second charging circuit unit 210, and the output unit 30.

The charging circuit unit 10 (a first charging circuit unit) has the same circuit configuration as in the first embodiment (see FIGS. 1, 3, and so on), and includes the charging path 12, which serves as a path in which charging current flows between the battery 92 (the vehicular power source unit) and the power storage units 3; the resistance units 14 (the charging path resistance units), which are provided in the charging path 12 and emit heat in response to the charging current flowing in the charging path 12; and the switching unit 16 (the charging path switching unit), which switches between states in which the charging current flows and does not flow in the charging path 12.

The mounting structure of the charging circuit unit 10 also has the same configuration as the first embodiment (see FIGS. 2, 4, and 5), and the resistance units 14 (the charging path resistance units) have the same configuration as in FIG. 4, being mounted to the one board surface 7A of the board unit 7 and disposed between the board unit 7 and the power storage units 3. In this example too, the resistance units 14 (the charging path resistance units) correspond to one example of heat-emitting components, and function so that current flows in response to the charging circuit unit 10 (the first charging circuit unit) performing predetermined charging operations (specifically, operations for turning the switching unit 16 on) and heat is emitted at least toward the power storage units 3.

The holding unit 40 has the same configuration as the holding unit 40 used in the power storage device 1 according to the first embodiment, and as illustrated in FIG. 4, is configured to fix the power storage units 3 and the board unit 7 in a state where the one board surface 7A of the board unit 7 faces an outer peripheral side of the power storage units 3. As in the configuration illustrated in FIG. 4, the resistance units 14 (the heat-emitting components) are disposed between the outer circumferential parts of the power storage units 3 and the board unit 7. The holding unit 40 is disposed between the one board surface 7A of the board unit 7 and the outer circumferential parts of the power storage units 3, and includes the support parts 42 (see FIG. 4) that support the outer circumferential parts of the power storage units 3. The openings 44 passing from the power storage unit 3 side surfaces of the support parts 42 to the board unit 7 side surfaces are formed in the support parts 42. The resistance units 14 (the heat-emitting components) are disposed in positions such that the resistance units 14 are inserted into the openings 44. In this example too, the power storage units 3 are arranged extending in a predetermined direction (the depth direction) along the one board surface 7A, and as in the configuration illustrated in FIG. 4, the plurality of resistance units 14 (heat-emitting components), which are arranged in the predetermined direction (the depth direction) along a corresponding power storage unit 3, are disposed facing the corresponding power storage unit 3 in the position of a corresponding opening 44 (see FIG. 4). The heat transfer members 50 (FIG. 4), which contact the resistance units 14 (the heat-emitting components) and the power storage units 3, are provided between the resistance units 14 (the heat-emitting components) and the power storage units 3.

As illustrated in FIGS. 6 and 7, in this configuration, the second charging circuit unit 210 is provided in addition to the same charging circuit unit 10 (the first charging circuit unit) as that in the above-described first embodiment, and a charging device 209 is constituted by the charging circuit unit 10 and the second charging circuit unit 210. As illustrated in FIG. 6, the second charging circuit unit 210 is connected to the charging circuit unit 10 (the first charging circuit unit) in parallel, and is constituted by connecting a second charging path 212, a plurality of second resistance units 214, and a second switching unit 216 in series.

The second charging path 212 is configured as a conductive path in which charging current flows between the battery 92 and the power storage units 3, and is configured as a path different from the charging path 12. The plurality of second resistance units 214 are provided in the second charging path 212, and are disposed in positions distanced from a space located between the board unit 7 and the power storage units 3. The second switching unit 216 is constituted by a semiconductor switch such as a MOSFET or a bipolar transistor, as a mechanical relay, or the like, and has a function for switching the second charging path 212 between a state in which charging current flows and a state in which charging current does not flow in response to a signal from the control unit 20.

The control unit 20 controls charging operations and charging stop operations of the charging circuit unit 10 and the second charging circuit unit 210 by controlling the switching operations of the switching unit 16 (the charging path switching unit) and the switching unit 216 (a second switching unit). When the control unit 20 outputs an on signal to the switching unit 16, the switching unit 16 turns on, and charging current flows in the charging circuit unit 10, and when the control unit 20 outputs an off signal to the switching unit 16, the switching unit 16 turns off, and no charging current flows in the charging circuit unit 10 at that time. Likewise, when the control unit 20 outputs an on signal to the switching unit 216, the switching unit 216 turns on, and charging current flows in the second charging circuit unit 210, and when the control unit 20 outputs an off signal to the switching unit 216, the second switching unit 216 turns off, and no charging current flows in the second charging circuit unit 210 at that time.

Charging control carried out by the control unit 20 will be described here.

The control unit 20 can execute the charging control illustrated in FIG. 8 using, for example, an ignition switch of a vehicle provided with the system 200 illustrated in FIG. 6 switching on as a condition for starting. Note that when the vehicle ignition switch is off, the charging control illustrated in FIG. 8 is stopped in order to suppress the consumption of power.

After the charging control illustrated in FIG. 8 is started, first, in step S1, the control unit 20 compares the output voltage of the power storage section 2 (also called a "capacitor voltage" hereinafter) with a target voltage, and determines whether or not the output voltage is less than the target voltage. If the control unit 20 determines in step S1 that the output voltage is not less than the target voltage (i.e., if the output voltage is greater than or equal to the target voltage; a determination of "no" in step S1), the charging control illustrated in FIG. 8 ends.

If the control unit 20 has determined in step S1 that the output voltage is less than the target voltage ("yes" in step S1), in step S2, the control unit 20 compares a temperature of the power storage section 2 (also called a "capacitor temperature" hereinafter) with a target temperature, and determines whether or not the capacitor temperature is less than the target temperature. Specifically, a temperature indicated by the detection value input from the temperature sensor 22 is the temperature of the power storage section 2 (the capacitor temperature), and it is determined whether or not the capacitor temperature is less than a set target temperature. Note that as in the first embodiment, the control unit 20 may set the target voltage to always be a set value, or may change the target voltage depending on the circumstances. For example, the target voltage may be set to a first voltage when the ignition switch is on, and the target voltage may be set to a second voltage, which is lower than the first voltage, when the ignition switch is off.

If the control unit 20 has determined, in the determination process of step S2, that the temperature of the power storage section 2 (the capacitor temperature) is less than the target temperature, in step S3, the control unit 20 turns the second switching unit 216 (a switch 2) off and turns the switching unit 16 (a switch 1) on. As a result of these switching operations, charging is carried out through the charging circuit unit 10, and in this case, the power storage units 3 are charged while being warmed by the heat produced by the resistance units 14. In other words, when the temperature of the power storage section 2 is relatively low, the power storage section 2 can warmed during the charging operations, and a drop in the performance of the power storage section 2 caused by a drop in temperature can be suppressed.

After step S3, the control unit 20 determines in step S4 whether or not the output voltage of the power storage section 2 (the capacitor voltage) is less than the target voltage. If the capacitor voltage is less than the target voltage ("yes" in step S4) the process returns to step S2, and the processes from step S2 on are carried out. If the control unit 20 has determined in step S4 that the output voltage of the power storage section 2 (the capacitor voltage) is not less than the target voltage ("no" in step S4), the control unit 20 turns both the second switching unit 216 (the switch 2) and the switching unit 16 (the switch 1) off, and stops the charging of the power storage section 2 by the charging device 209.

On the other hand, if the control unit 20 has determined, in the determination process of step S2, that the temperature of the power storage section 2 (the capacitor temperature) is not less than the target temperature, in step S6, the control unit 20 turns the switching unit 16 (the switch 1) off and the second switching unit 216 (the switch 2) on. As a result of these switching operations, the charging is carried out through the second charging circuit unit 210, and in this case, a situation where the power storage section 2 is heated by the resistance units 14 during charging is suppressed. In other words, when the temperature of the power storage section 2 is relatively high, the heating of the power storage section 2 by the heat emitting on the basis of the charging current is stopped, which makes it possible to suppress an excessive rise in the temperature of the power storage section 2.

After step S6, the control unit 20 determines in step S7 whether or not the output voltage of the power storage section 2 (the capacitor voltage) is less than the target voltage. If the capacitor voltage is less than the target voltage ("yes" in step S7), the process returns to step S2, and the processes from step S2 on are carried out. If the control unit 20 has determined in step S7 that the output voltage of the power storage section 2 (the capacitor voltage) is not less than the target voltage ("no" in step S7), the control unit 20 turns both the switching unit 16 (the switch 1) and the switching unit 216 (the switch 2) off, and stops the charging of the power storage section 2 by the charging device 209.

According to this configuration, the temperature sensor 22 corresponds to one example of a temperature detection unit, and functions so as to detect the temperature of the power storage units 3. Additionally, when charging the power storage units 3 while the temperature detected by the temperature sensor 22 (the temperature detection unit) is greater than or equal to a predetermined value (the target temperature), the control unit 20 controls the operations of the switching unit 16 (the charging path switching unit) and the switching unit 216 (the second switching unit) so that no charging current flows in the charging circuit unit 10 and charging current flows in the second charging circuit unit 210.

Examples of the effects of this configuration will be given here.

In the control device 205 according to this configuration, the charging device 209 (charging circuit) includes the charging circuit unit 10 (the first charging circuit unit) and the second charging circuit unit 210. The second charging circuit unit 210 includes the second charging path 212, which is configured as a path in which charging current based on the power from the battery 92 (the vehicular power source unit) flows to the power storage units 3 and is configured as a path that is different from the charging path 12; the second resistance units 214, which are provided in the second charging path 212 and are disposed in positions distanced from a space located between the board unit 7 and the power storage units 3; and the second switching unit 216, which switches the second charging path 212 between a state in which the charging current flows and a state in which the charging current does not flow. The control unit 20 has a function for controlling the charging operations carried out by the charging circuit unit 10 and the second charging circuit unit 210 by controlling at least the switching operations carried out by the switching unit 16 (the charging path switching unit) and the switching unit 216 (the second switching unit).

The control device 205 configured in this manner includes both the charging circuit unit 10 (the first charging circuit unit), which supplies charging current via the resistance units (the resistance units 14) provided between the board unit 7 and the power storage units 3, and the second charging circuit unit 210, which supplies charging current via the resistance units 214 (the second resistance units) disposed in positions distanced from the space between the board unit 7 and the power storage units 3, and is capable of controlling the charging operations of both. The charging circuit unit 10 (the first charging circuit unit) enables charging operations in which heat produced by the resistance units (the resistance units 14) is easily transmitted to the power storage units 3, whereas the second charging circuit unit 210 enables charging operations in which heat produced by the resistance units (the second resistance units 214) is not easily transmitted to the power storage units 3.

Additionally, the control device 205 includes the temperature sensor 22 (the temperature detection unit), which detects the temperature of the power storage units 3. When the power storage units 3 are to be charged while the temperature detected by the temperature sensor 22 (the temperature detection unit) is greater than or equal to a predetermined value, the control unit 20 controls the switching operations by the switching unit 16 (the charging path switching unit) and the switching unit 216 (the second switching unit) so that the charging current does not flow in the charging circuit unit 10 (the first charging circuit unit) but the charging current does flow in the second charging circuit unit 210. With the control device 205 configured in this manner, when the power storage units 3 are to be charged while the temperature of the power storage units 3 is relatively high, the charging current can be supplied by the second charging circuit unit 210, in a state where heat is not easily transmitted to the power storage units 3, while suppressing heat emission from the resistance units (the resistance units 14). Thus a situation where, when the temperature of the power storage units 3 has risen to a given level, the temperature of the power storage units 3 rises excessively due to the effects of heat emission during charging can be suppressed.

Third Embodiment

A third embodiment will be described next.

Figure 9:
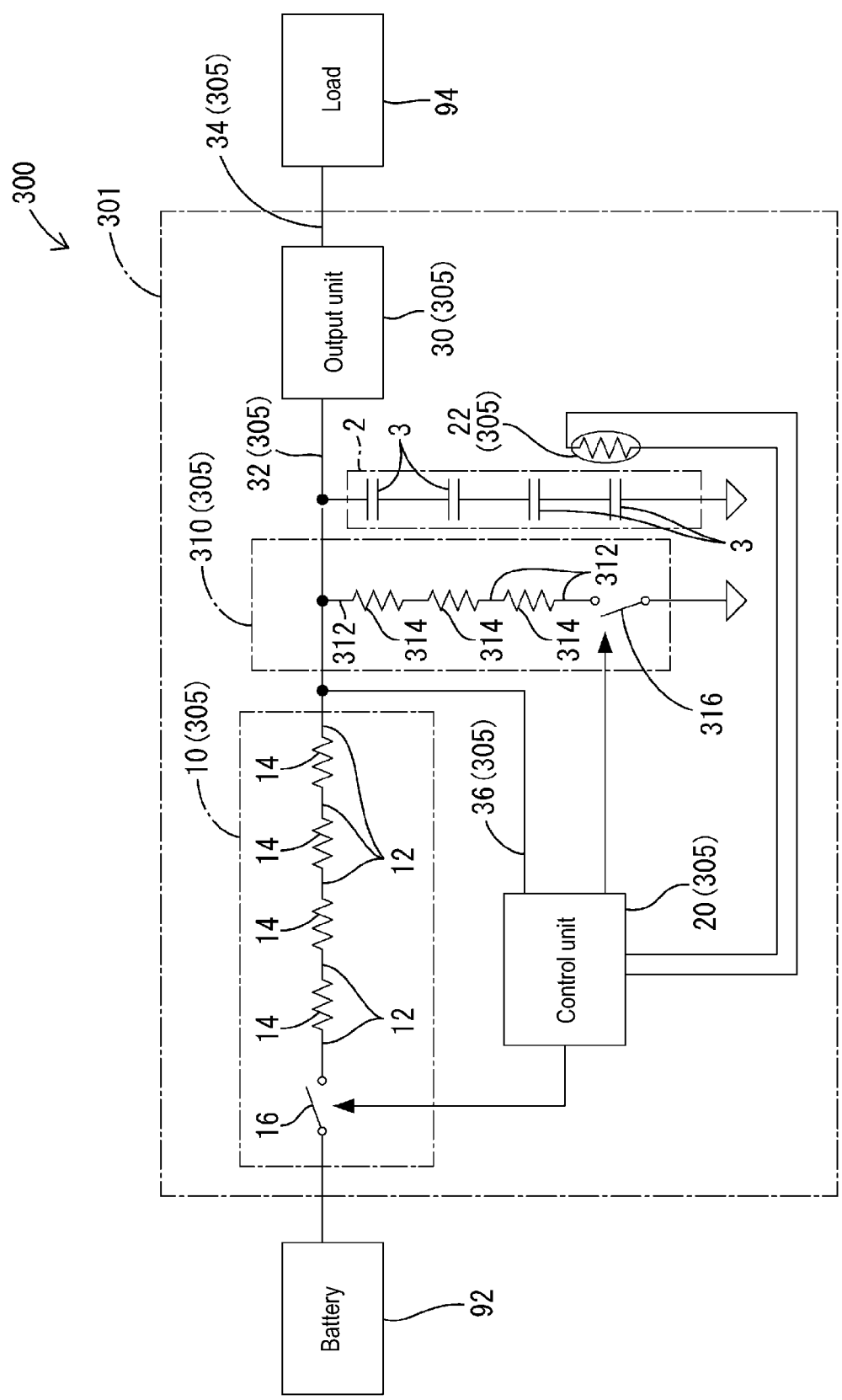
FIG. 9 is a circuit diagram illustrating an overview of a vehicular power source system according to a third embodiment.
Figure 10:
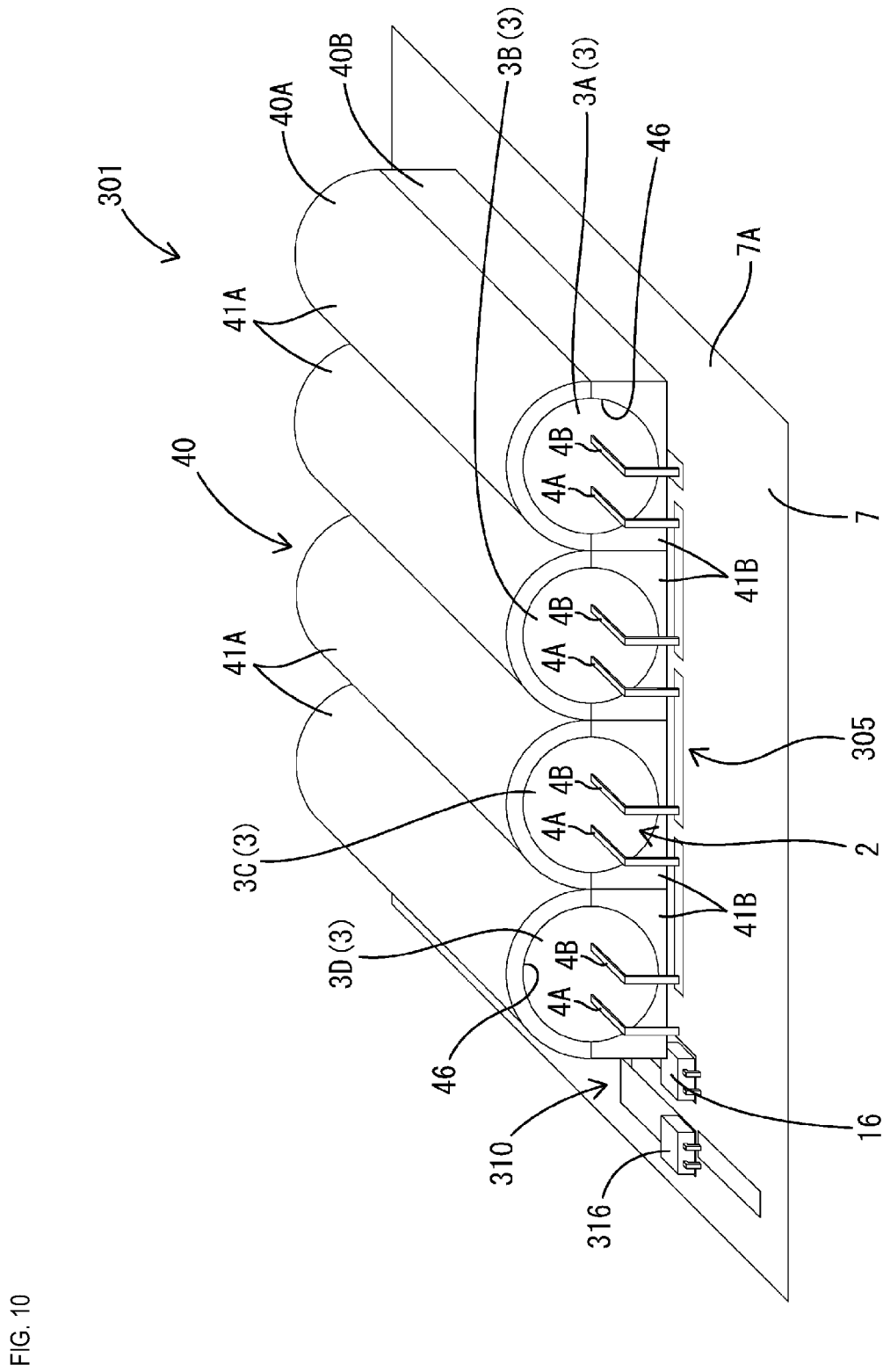
FIG. 10 is a perspective view illustrating the external appearance of the vehicular power storage device according to the third embodiment in a simplified manner.
Figure 11:
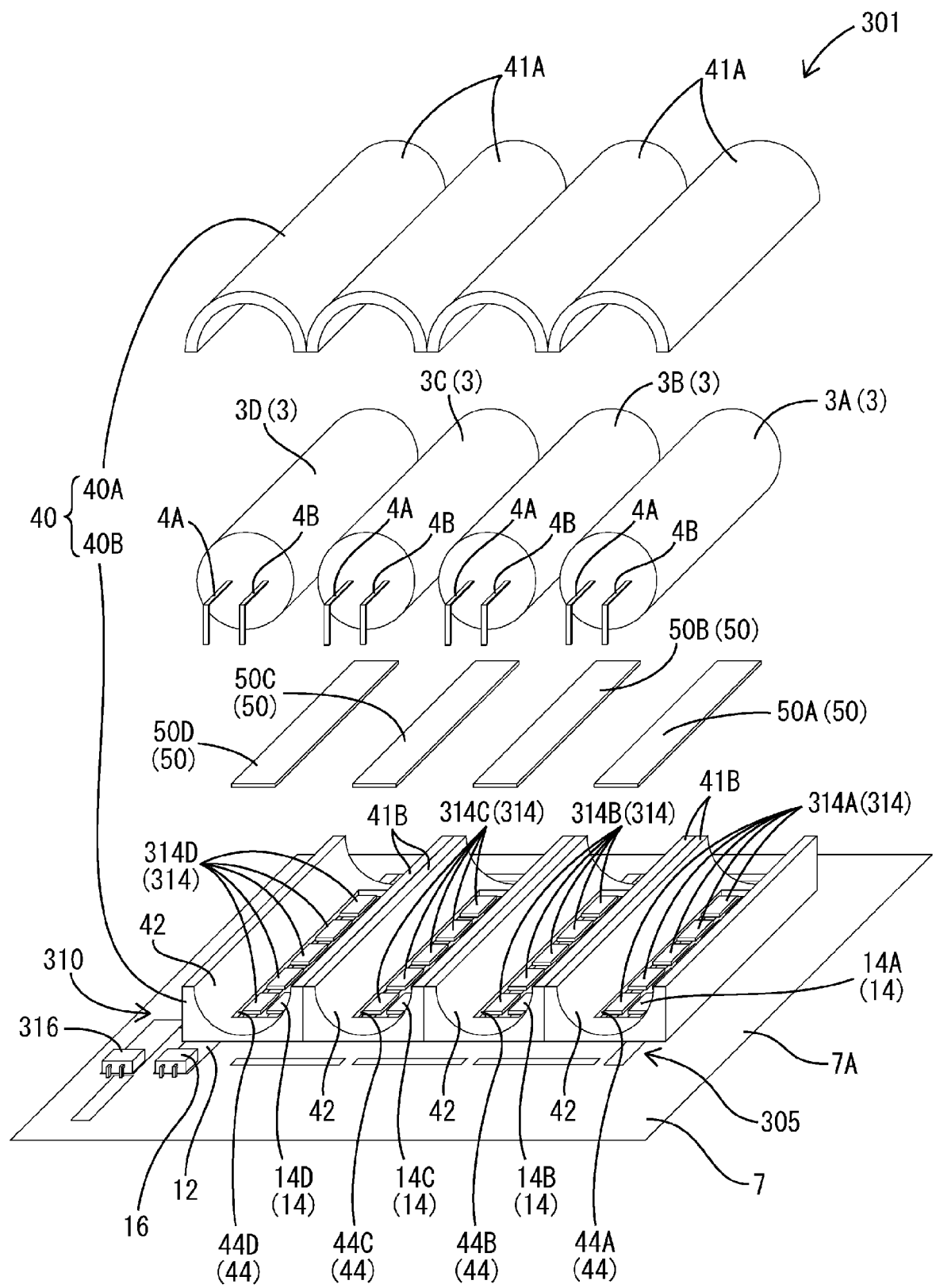
FIG. 11 is an exploded perspective view illustrating the vehicular power storage device of the third embodiment in an exploded state.
Figure 12:
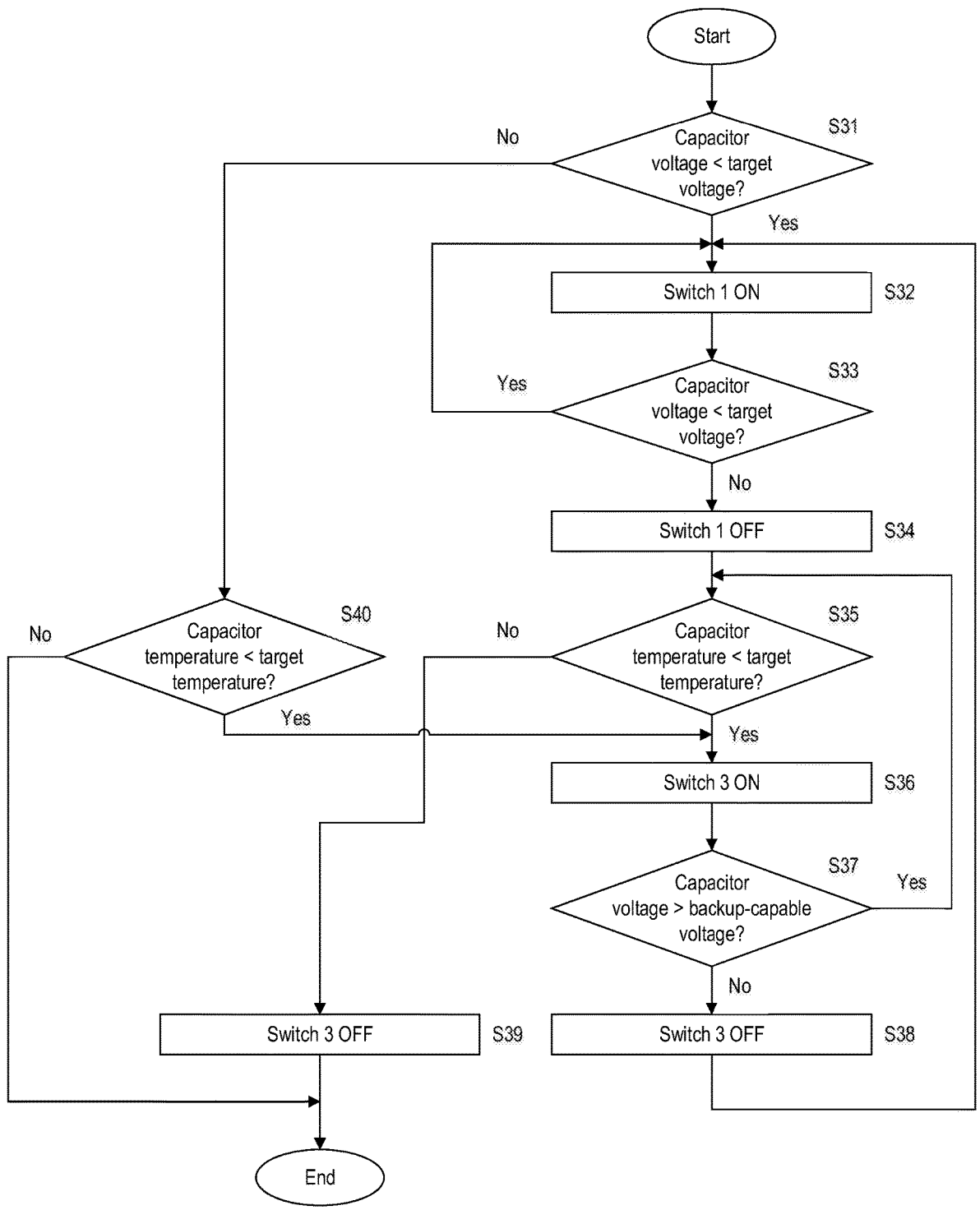
FIG. 12 is a flowchart illustrating an example of the flow of charging control carried out by the vehicular power storage device according to the third embodiment.

A vehicular power source system 300 according to the third embodiment, illustrated in FIG. 9, differs from the vehicular power source system 100 according to the first embodiment only in that a discharge circuit unit 310 is provided, and that control such as that illustrated in FIG. 12 is implemented. The parts of the vehicular power source system 300 according to the third embodiment aside from the discharge circuit unit 310 are the same as the parts of the vehicular power source system 100 according to the first embodiment (FIGS. 1, 3, and so on). Parts of the vehicular power source system 300 that are the same as those in the vehicular power source system 100 according to the first embodiment are given the same reference signs as in the vehicular power source system 100, and detailed descriptions thereof will be omitted. As illustrated in FIG. 9, the circuitry of a power storage device 301 differs from the circuitry of the power storage device 1 according to the first embodiment (FIG. 3) only in that the discharge circuit unit 310 has been added and the configuration is such that a switching unit 316 can be controlled by the control unit 20, and aside from this is the same as the circuitry of the power storage device 1. Additionally, as illustrated in FIGS. 10 and 11, the mounting structure of the power storage device 301 differs from the mounting structure of the power storage device 1 described in the first embodiment (FIGS. 2 and 4) only in that the components constituting the discharge circuit unit 310 are mounted on the board unit 7, and that the openings 44 have been made slightly larger than in the first embodiment (FIG. 4) in order to enable resistance units 314 which constitute the discharge circuit unit 310 to be disposed. Aside from this, the mounting structure is the same as in the power storage device 1.

As illustrated in FIG. 9, the vehicular power source system 300 includes the same battery 92 as in the first embodiment and the power storage device 301 (a vehicular power storage device), and is configured as a system that can supply power to the load 94.

The power storage device 301 includes the power storage section 2, which is constituted by a plurality of power storage units 3, and a control device 305 (a vehicular power storage unit control device). The power storage section 2 has the same configuration as the power storage section 2 according to the first embodiment, and the same functions. The control device 305 corresponds to the parts of the power storage device 301 illustrated in FIGS. 10 and 11 excluding the power storage section 2, and has a configuration in which the discharge circuit unit 310 has been added to the control device 5 according to the first embodiment (FIGS. 1, 2, and so on).

As illustrated in FIGS. 9 to 11, the control device 305 includes the holding unit 40, which holds the power storage units 3; the board unit 7, with the one board surface 7A arranged on the power storage unit 3 side; the charging circuit unit 10, which can supply charging current to the power storage units 3; the output unit 30; and the control unit 20, which can control the charging circuit unit 10, the output unit 30, and so on.

The charging circuit unit 10 (a first charging circuit unit) has the same circuit configuration as in the first embodiment (see FIGS. 1, 3, and so on), and includes the charging path 12, which serves as a path in which charging current flows between the battery 92 (the vehicular power source unit) and the power storage units 3; the resistance units 14 (the charging path resistance units), which are provided in the charging path 12 and emit heat in response to the charging current flowing in the charging path 12; and the switching unit 16 (the charging path switching unit), which switches between states in which the charging current flows and does not flow in the charging path 12. The mounting structure of the charging circuit unit 10 also has the same configuration as the first embodiment (see FIGS. 2, 4, and 5), and the resistance units 14 (the charging path resistance units) have the same configuration as in FIG. 4, being mounted to the one board surface 7A of the board unit 7 and disposed between the board unit 7 and the power storage units 3. In this example too, the resistance units 14 (the charging path resistance units) correspond to one example of heat-emitting components, and function so that current flows in response to the charging circuit unit 10 (the first charging circuit unit) performing predetermined charging operations (specifically, operations for turning the switching unit 16 on) and heat is emitted at least toward the power storage units 3.

As illustrated in FIG. 9, the control device 305 further includes the discharge circuit unit 310. The discharge circuit unit 310 includes a discharge path 312, which is electrically connected to the power storage units 3 and which serves as a path for discharge current from the power storage units 3; resistance units 314, which are provided in the discharge path 312 and which emit heat in response to discharge current flowing in the discharge path 312; and the switching unit 316, which switches the discharge path 312 between a state in which discharge current from the power storage units 3 flows and a state in which discharge current from the power storage units 3 does not flow. The discharge circuit unit 310 has a configuration in which the switching unit 316 and the plurality of resistance units 314 (discharge path resistance units) are connected in series between the conductive path 32, which is connected to the power storage section 2, and a ground. Note that the number of resistors constituting the resistance units 314 is not particularly limited. In the example illustrated in FIGS. 9 to 11, a plurality of resistance units 314 connected in series to the discharge circuit unit 310 are disposed, as four discharge resistor groups, in positions below the corresponding power storage units 3, so that a first discharge resistor group, a second discharge resistor group, a third discharge resistor group, and a fourth discharge resistor group are connected in series, as illustrated in FIG. 11. Because this configuration is used, charging current flows in all of the discharge resistor groups when the switching unit 316 is on, and thus all of the discharge resistor groups produce heat. Accordingly, all of the power storage units 3 are heated during the discharge operations of the discharge circuit unit 310.

The holding unit 40 illustrated in FIGS. 10, 11, and so on has the same configuration as the holding unit 40 used in the power storage device 1 according to the first embodiment, and like the configuration illustrated in FIG. 4, is configured so as to fix the power storage units 3 and the board unit 7 with the one board surface 7A of the board unit 7 facing the outer peripheral sides of the power storage units 3. The resistance units 14 and 314 (the heat-emitting components) are disposed between the outer circumferential parts of the power storage units 3 and the board unit 7. As illustrated in FIG. 11, the holding unit 40 includes the support parts 42, which are disposed between the one board surface 7A of the board unit 7 and the outer circumferential parts of the power storage units 3, and which support the outer circumferential parts of the power storage units 3. The openings 44 passing from the power storage unit 3 side surfaces of the support parts 42 to the board unit 7 side surfaces are formed in the support parts 42. The resistance units 14 and 314 (the heat-emitting components) are disposed in positions such that the resistance units 14 and 314 are inserted into the openings 44. In this example too, the power storage units 3 are arranged extending in a predetermined direction (the depth direction) along the one board surface 7A, and the plurality of resistance units 14 and 314 (heat-emitting components), which are arranged in the predetermined direction (the depth direction) along a corresponding power storage unit 3, are disposed facing the corresponding power storage unit 3 in the position of a corresponding opening 44.

As illustrated in FIG. 11, the resistance units 14 and the resistance units 314 functioning as heat-emitting components are disposed between the outer circumferential parts of the power storage units 3 and the board unit 7. In the example illustrated in FIG. 11 too, the mounting structure of the resistance units 14 is the same as in the first embodiment, with the plurality of the resistance units 14 arranged in a predetermined direction (the depth direction) in the position of the corresponding opening 44 formed in the corresponding support part 42, with all of the resistance units 14 arranged so as to be at least partially inserted into the openings 44 and facing the power storage units 3. In the example illustrated in FIG. 11 too, the plurality of resistance units 14 are constituted by a first charging resistor group, which is constituted by a plurality of first resistors 14A arranged in the depth direction, a second charging resistor group, which is constituted by a plurality of second resistors 14B arranged in the depth direction, a third charging resistor group, which is constituted by a plurality of third resistors 14C arranged in the depth direction, and a fourth charging resistor group, which is constituted by a plurality of fourth resistors 14D arranged in the depth direction.

Furthermore, each discharge resistor group is disposed side-by-side with a corresponding charging resistor group. First resistors 314A constituting the first discharge resistor group are mounted on the board surface 7A and connected in series while being arranged in the depth direction, and are partially inserted into the first opening 44A, among the plurality of openings 44, so as to face the first power storage units 3A. Accordingly, a row corresponding to the first charging resistor group and a row corresponding to the first discharge resistor group are disposed near each other within the first opening 44A. Second resistors 314B constituting the second discharge resistor group are mounted on the board surface 7A and connected in series while being arranged in the depth direction, and are partially inserted into the second opening 44B, among the plurality of openings 44, so as to face the second power storage units 3B. Accordingly, a row corresponding to the second charging resistor group and a row corresponding to the second discharge resistor group are disposed near each other within the second opening 44B. Third resistors 314C constituting the third discharge resistor group are mounted on the board surface 7A and connected in series while being arranged in the depth direction, and are partially inserted into the third opening 44C, among the plurality of openings 44, so as to face the third power storage units 3C. Accordingly, a row corresponding to the third charging resistor group and a row corresponding to the third discharge resistor group are disposed near each other within the third opening 44C. Fourth resistors 314D constituting the fourth discharge resistor group are mounted on the board surface 7A and connected in series while being arranged in the depth direction, and are partially inserted into the fourth opening 44D, among the plurality of openings 44, so as to face the fourth power storage units 3D. Accordingly, a row corresponding to the fourth charging resistor group and a row corresponding to the fourth discharge resistor group are disposed near each other within the fourth opening 44D.

According to this configuration, the first heat transfer member 50A is disposed between the plurality of first resistors 14A and 314A, which constitute the first charging resistor group and the first discharge resistor group in the first opening 44A, and the first power storage units 3A, so as to be interposed between the plurality of first resistors 14A and 314A and the first power storage units 3A. The second heat transfer member 50B is disposed between the plurality of second resistors 14B and 314B, which constitute the second charging resistor group and the second discharge resistor group in the second opening 44B, and the second power storage units 3B, so as to be interposed between the plurality of second resistors 14B and 314B and the second power storage units 3B. The third heat transfer member 50C is disposed between the plurality of third resistors 14C and 314C, which constitute the third charging resistor group and the third discharge resistor group in the third opening 44C, and the third power storage units 3C, so as to be interposed between the plurality of third resistors 14C and 314C and the third power storage units 3C. The fourth heat transfer member 50D is disposed between the plurality of fourth resistors 14D and 314D, which constitute the fourth charging resistor group and the fourth discharge resistor group in the fourth opening 44D, and the fourth power storage units 3D, so as to be interposed between the plurality of fourth resistors 14D and 314D and the fourth power storage units 3D.

Charging control carried out by the control unit 20 will be described here.

The control unit 20 can execute the charging control illustrated in FIG. 12 using, for example, an ignition switch of a vehicle provided with the system 300 illustrated in FIG. 9 switching on as a condition for starting. Note that when the vehicle ignition switch is off, the charging control illustrated in FIG. 12 is stopped in order to suppress the consumption of power.

After the charging control illustrated in FIG. 12 is started, first, in step S31, the control unit 20 compares the output voltage of the power storage section 2 (the capacitor voltage) with a target voltage, and determines whether or not the output voltage is less than the target voltage. Note that as in the first embodiment, the control unit 20 may set the target voltage to always be a set value, or may change the target voltage depending on the circumstances. For example, the target voltage may be set to a first voltage when the ignition switch is on, and the target voltage may be set to a second voltage, which is lower than the first voltage, when the ignition switch is off.

If the control unit 20 has determined in step S31 that the output voltage (the capacitor voltage) is not less than the target voltage (i.e., if the output voltage is greater than or equal to the target voltage; a determination of "no" in step S31), in step S40, the control unit 20 compares the temperature of the power storage section 2 (the capacitor temperature) with a predetermined target temperature, and determines whether or not the capacitor temperature is less than the target temperature. Specifically, a temperature indicated by the detection value input from the temperature sensor 22 is the temperature of the power storage section 2 (the capacitor temperature), and it is determined whether or not the capacitor temperature is less than the pre-set target temperature. If the control unit 20 has determined in step S40 that the temperature of the power storage section 2 (the capacitor temperature) is not less than the target temperature, the control of FIG. 12 is ended. Note that when the control of FIG. 12 is ended, the control of FIG. 12 is executed again after a short interval of time.

If the control unit 20 has determined in step S31 that the output voltage (the capacitor voltage) is less than the target voltage ("yes" in step S31), the switching unit 16 (the switch 1) is turned on. The power storage section 2 is charged through the charging circuit unit 10 as a result of these switching operations.

After step S32, the control unit 20 determines in step S33 whether or not the output voltage of the power storage section 2 (the capacitor voltage) is less than the target voltage. If the capacitor voltage is less than the target voltage ("yes" in step S33), the process returns to step S32, and the processes of step S32 and S33 are carried out. If the control unit 20 has determined in step S33 that the output voltage of the power storage section 2 (the capacitor voltage) is not less than the target voltage ("no" in step S33), in step S34, the control unit 20 turns the switching unit 16 (the switch 1) off, and stops the charging of the power storage section 2 by the charging circuit unit 10.

After step S34, in step S35, the control unit 20 compares the temperature of the power storage section 2 (the capacitor temperature) with a target temperature, and determines whether or not the capacitor temperature is less than the target temperature. If the control unit 20 has determined, in the determination process of step S35, that the temperature of the power storage section 2 (the capacitor temperature) is less than the target temperature, the control unit 20 turns the switching unit 316 (a switch 3) on. As a result of these switching operations, discharging is carried out through the discharge circuit unit 310, and in this case, the power storage units 3 are discharged while being warmed by the heat produced by the resistance units 314.

After step S36, the control unit 20 determines in step S37 whether or not the output voltage of the power storage section 2 (the capacitor voltage) is greater than a backup-capable voltage. If the capacitor voltage is greater than the backup-capable voltage ("yes" in step S37), the process returns to step S35, and the processes from step S35 on are carried out. If the control unit 20 has determined in step S37 that the output voltage of the power storage section 2 (the capacitor voltage) is not greater than the backup-capable voltage ("no" in step S37), the control unit 20 turns the switching unit 316 (the switch 3) off and carries out the processes of step S32 and on. Note that the "backup-capable voltage" is a lower limit for the voltage output by the power storage section 2 when supplying a voltage greater than or equal to a predetermined value to the load 94 (a voltage that allows the load 94 to operate normally), when the output unit 30 is operated while the supply of power from the battery 92 is cut off, and is a voltage lower than the target voltage. In other words, as long as the output voltage of the power storage section 2 is greater than or equal to the value of the backup-capable voltage, a voltage greater than or equal to a predetermined value can be applied to the conductive path 34 by operating the output unit 30, even if the supply of power from the battery 92 is cut off.

If the control unit 20 has determined, in the determination process of step S35, that the temperature of the power storage section 2 (the capacitor temperature) is not less than the target temperature, in step S39, the control unit 20 turns the switching unit 316 (the switch 3) off, and ends the control of FIG. 12.

On the other hand, if the control unit 20 has determined in step S40 that the temperature of the power storage section 2 (the capacitor temperature) is less than the target temperature, the control unit 20 carries out the processes of step S36 and on. In this case, the discharge circuit unit 310 carries out discharge operations until the capacitor temperature becomes greater than or equal to the target temperature or until the capacitor voltage becomes less than or equal to the backup-capable voltage, and the power storage section 2 is further warmed.

According to this configuration, the temperature sensor 22 corresponds to one example of a temperature detection unit, and functions so as to detect the temperature of the power storage units 3. The control unit 20 has a function for controlling the switching operations of the switching unit 16 and the switching unit 316. The control unit 20 has a function for repeating the discharge operations of switching the switching unit 316 so that discharge current flows in the discharge path 312 and the charging operations of switching the switching unit 16 so that charging current flows in the charging path 12 in an alternating manner when a predetermined condition is satisfied (when the capacitor temperature is less than the target temperature even when the capacitor voltage has reached the target voltage).

Examples of the effects of this configuration will be given here.

In the control device 305 according to this configuration, the discharge circuit unit 310 includes the discharge path 312, which is electrically connected to the power storage units 3 and which serves as a path for discharge current from the power storage units 3; the resistance units 314 (discharge path resistance unit), which are provided in the discharge path 312 and which emit heat in response to discharge current flowing in the discharge path 312; and the switching unit 316 (a discharge path switching unit), which switches the discharge path 312 between a state in which discharge current from the power storage units 3 flows and a state in which discharge current from the power storage units 3 does not flow. The control unit 20 has a function for controlling the discharge operations of the discharge circuit unit 310, and specifically controls the discharge operations performed by the discharge circuit unit 310, by controlling the switching operations performed by the switching unit 316. With the control device 305 configured in this manner, when the discharge circuit unit 310 is operated to cause discharge current to flow from the power storage units 3, the resistance units provided in the discharge path 312 (the resistance units 314) function as heat-emitting components, and the temperature of the power storage units 3 can be raised efficiently by using the heat produced by the resistance units 314.

The control unit 20 has a function for repeating control for causing the discharge circuit unit 310 to perform discharge operations so that discharge current flows in the discharge path 312 and control for causing the charging circuit unit 10 to perform charging operations so that charging current flows in the charging path 12 when a predetermined condition is satisfied (specifically, when the capacitor temperature is less than the target temperature even when the capacitor voltage has reached the target voltage). With the control device 305 configured in this manner, the resistance units can be caused to generate heat, and that heat can be transmitted to the power storage units 3, both when the charging current is flowing and when the discharge current is flowing. Thus by repeating the discharge operations and the charging operations, this heat transmission can be continued over a longer period of time.

When a predetermined condition is satisfied, the control unit 20 repeats control for causing the discharge circuit unit 310 to perform discharge operations so that discharge current flows in the discharge path 312 within a voltage range where the output voltage of the power storage units 3 is greater than or equal to a predetermined voltage (specifically, a voltage range where the output voltage of the power storage section 2 is greater than or equal to the backup-capable voltage), and control for causing the charging circuit unit 10 to carry out charging operations so that charging current flows in the charging path 12, in an alternating manner. With the control device 5 configured in this manner, heat transmission to the power storage units 3 can be continued for a longer period of time. Moreover, while continuing this heat transmission, discharge operations are carried out within the voltage range where the output voltage of the power storage units 3 is greater than or equal to the predetermined voltage, and thus output greater than or equal to the predetermined voltage can be supplied quickly even if a situation in which power should be supplied from the power storage units 3 has arisen while repeating the charging/discharging for transmitting the heat. For example, even if a situation in which power should be supplied from the power storage section 2 to the load 94 has arisen when repeating the charging/discharging, it is unlikely that backup operations, in which power is supplied to the load 94, will be unable to be carried out or will be delayed.

Other Embodiments

The present disclosure is not limited to the embodiments described above with reference to the drawings, and embodiments such as the following, for example, also fall within the technical scope of the present disclosure.

The foregoing embodiments describe the power storage units 3, which are configured as electrical double-layer capacitors, as examples of the power storage units. However, the power storage units 3 may be other power storage means, such as lithium-ion batteries, lithium-ion capacitors, or the like. Additionally, the number of the power storage units 3 constituting the power storage section 2 is not particularly limited. Additionally, the power storage device may be configured so as to include a plurality of the power storage sections.

The foregoing embodiments describe a charging circuit in which resistance units provided in a conductive path are current limiting resistors, and charging current is supplied via the resistance units, as an example of a charging circuit. However, as long as the circuit includes a component that emits heat on the basis of power supplied from the battery 92, the charging circuit may be a voltage transform circuit such as a DC-DC converter or another known charging circuit. Additionally, the heat-emitting components are not limited to resistors, and may be coils, semiconductor switching elements, or the like.

The foregoing embodiments describe a configuration that uses a semiconductor switch or the like to switch the conductive path 32 and the conductive path 34 between conductive states and non-conductive states as an example of output unit 30. However, the output unit 30 is not limited to this configuration. For example, the output unit 30 may be constituted by a DC-DC converter that steps the input voltage applied to the conductive path 32 up or down to a predetermined voltage and outputs a predetermined output voltage to the conductive path 34.

The foregoing embodiments describe an example in which the resistance units functioning as the heat-emitting components are partially inserted into the openings 44. However, the heat-emitting components need not be inserted into the openings 44. For example, the heat-emitting components may be disposed facing the openings 44, projecting further toward the open regions of the openings 44 than the board surface of the board unit near the openings 44.

The foregoing embodiments describe an example of the condition for starting to charge the power storage section 2 (a predetermined charging start condition). However, the condition is not limited to this example, and the charging of the power storage section 2 may be started when another condition is satisfied. For example, the conditions for starting to execute the control of FIG. 8, FIG. 12, or the like are also not limited to the conditions described in the foregoing embodiments, and may be started when other conditions are satisfied.

The control according to the second embodiment (FIG. 8) may be changed so that charging is performed by the charging circuit unit 10 when the temperature of the power storage section 2 is less than a first temperature; charging is performed by the charging circuit unit 10 and the second charging circuit unit 210 when the temperature of the power storage section 2 is greater than or equal to the first temperature and less than a second temperature, which is higher than the first temperature; and charging is performed by the second charging circuit unit 210 when the temperature of the power storage section 2 is greater than or equal to the second temperature.

Figure 13:
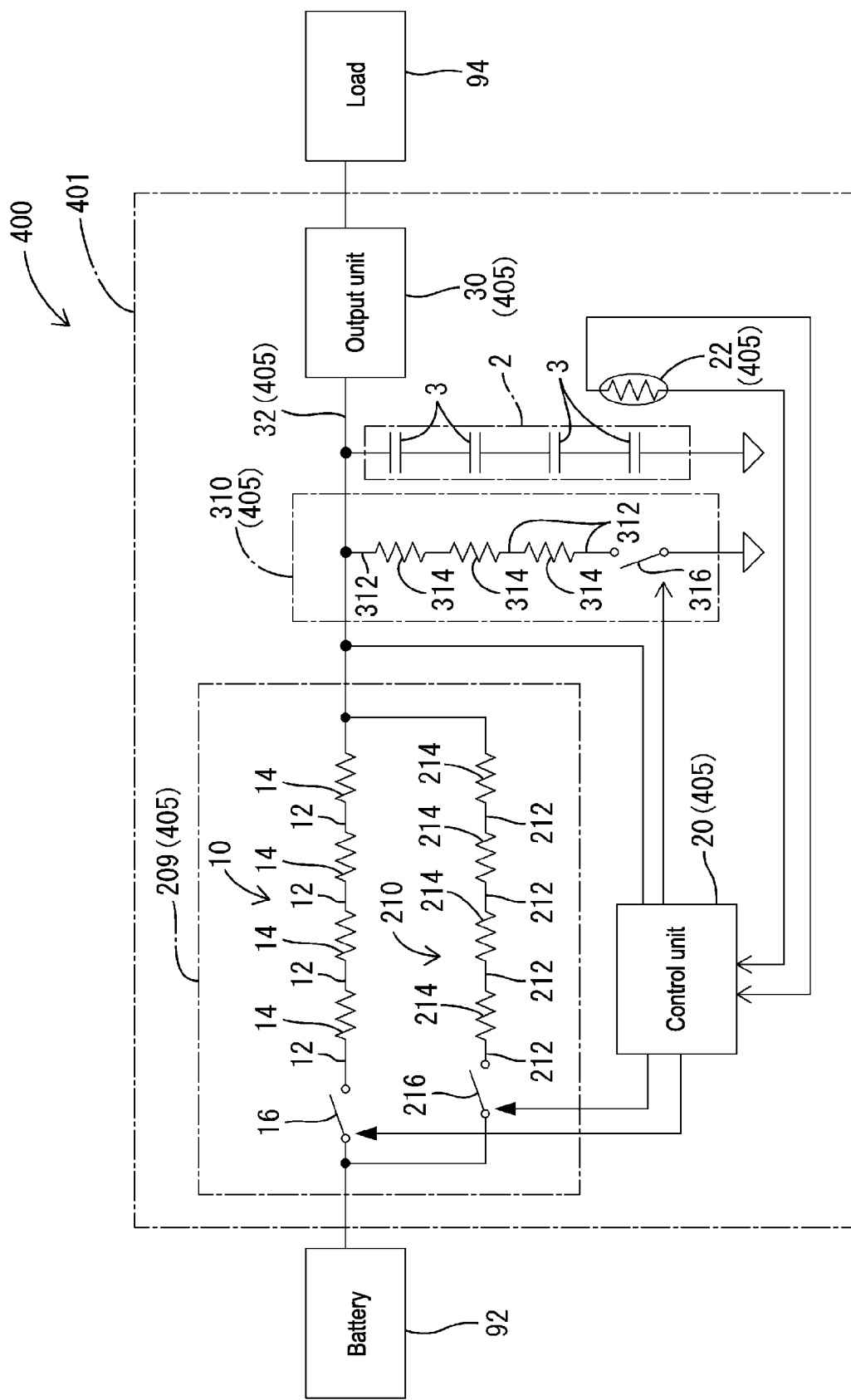
FIG. 13 is a circuit diagram illustrating an overview of a vehicular power source system according to another embodiment.

The vehicular power source system 300 according to the third embodiment may be changed as illustrated in FIG. 13. A vehicular power source system 400 illustrated in FIG. 13 differs from the vehicular power source system 100 according to the first embodiment in that the second charging circuit unit 210 and the discharge circuit unit 310 are provided. A power storage device 401 corresponds to the parts of the vehicular power source system 400 illustrated in FIG. 13 excluding the battery 92 and the load 94, and a control device 405 corresponds to the parts of the power storage device 401 excluding the power storage section 2, in the same manner as in the first embodiment. The circuit configuration of the control device 405 illustrated in FIG. 13 adds the same second charging circuit unit 210 as in the second embodiment, to the circuitry of the control device 305 according to the third embodiment (FIG. 9). Additionally, the mounting structure of the control device 405 adds the same second charging circuit unit 210 as in the second embodiment, and the same mounting structure as illustrated in FIG. 7, to the mounting structure of the control device 305 according to the third embodiment (FIGS. 10 and 11). The parts of the vehicular power source system 400 illustrated in FIG. 13 aside from the second charging circuit unit 210 are the same as the parts of the vehicular power source system 300 according to the third embodiment (FIG. 9).

The foregoing embodiments describe an example in which the power storage section 2 is constituted by four power storage units 3. However, the number of power storage units constituting the power storage section 2 may be one, or may be a plurality aside from 4.

The invention claimed is:

1. A control device for a vehicular power storage unit, the device comprising:
   a holding unit that holds the vehicular power storage unit;
   a board unit disposed with one board surface arranged on a side where the holding unit is located;
   a circuit unit that carries out at least one of charging operations of supplying charging current to the power storage unit and discharge operations of supplying discharge current from the power storage unit; and
   a heat-emitting component configured to generate heat by application of the current, the heat-emitting component mounted on the one board surface of the board unit and disposed in a region between the board unit and the power storage unit, wherein current flows in the heat-emitting component in response to the circuit unit performing predetermined charging operations or predetermined discharge operations, and the heat-emitting component emits heat at least toward the holding unit wherein the circuit unit is further configured to actuate the heat-emitting component when a temperature of the vehicle power storage unit falls below a predetermined temperature.

2. The control device for a vehicular power storage unit according to claim 1, further comprising:
   a control unit that controls at least the charging operations performed by the circuit unit,
   wherein the circuit unit includes a charging circuit unit, the charging circuit unit including a charging path serving as a path in which charging current based on power from a vehicular power source unit flows to the power storage unit, the heat-emitting component including a charging path resistance unit provided in the charging path and emitting heat in response to charging current flowing in the charging path, and a charging path switching unit that switches the charging path between a state in which charging current flows and a state in which charging current does not flow;
   at least the charging path resistance unit is a plurality of resistors; and
   the control unit controls the charging operations performed by the charging circuit unit by controlling at least switching operations performed by the charging path switching unit.

3. The control device for a vehicular power storage unit according to claim 2,
   wherein the circuit unit includes a second charging circuit unit, the second charging circuit unit including a second charging path configured as a path in which charging current based on power from the vehicular power source unit flows to the power storage unit and configured as a path different from the charging path, a second resistance unit provided in the second charging path and disposed in a position distanced from a space between the board unit and the power storage unit, and a second switching unit that switches the second charging path between a state in which charging current flows and the state in which charging current does not flow; and
   the control unit controls the charging operations performed by the charging circuit unit and the second charging circuit unit by controlling at least the switching operations performed by the charging path switching unit and the second switching unit.

4. The control device for a vehicular power storage unit according to claim 3, further comprising:
a temperature detection unit that detects a temperature of the power storage unit,
wherein when the power storage unit is charged while the temperature detected by the temperature detection unit is greater than or equal to a predetermined value, the control unit controls the switching operations performed by the charging path switching unit and the second switching unit so that charging current does not flow in the charging circuit unit and charging current flows in the second charging circuit unit.

5. The control device for a vehicular power storage unit according to claim 1, further comprising:
a control unit that controls at least the discharge operations performed by the circuit unit,
wherein the circuit unit includes a discharge circuit unit, the discharge circuit unit including a discharge path electrically connected to the power storage unit and serving as a path for the discharge current from the power storage unit, a discharge path resistance unit provided in the discharge path and emitting heat in response to the discharge current flowing in the discharge path, and a discharge path switching unit that switches the discharge path between a state in which the discharge current from the power storage unit flows and a state in which the discharge current from the power storage unit does not flow; and
the control unit controls the discharge operations performed by the discharge circuit unit by controlling at least switching operations performed by the discharge path switching unit.

6. The control device for a vehicular power storage unit according to claim 2,
wherein the circuit unit includes a discharge circuit unit, the discharge circuit unit including a discharge path electrically connected to the power storage unit and serving as a path for the discharge current from the power storage unit, a discharge path resistance unit provided in the discharge path and emitting heat in response to the discharge current flowing in the discharge path, and a discharge path switching unit that switches the discharge path between a state in which the discharge current from the power storage unit flows and a state in which the discharge current from the power storage unit does not flow; and
the control unit controls the discharge operations performed by the discharge circuit unit by controlling at least the switching operations performed by the discharge path switching unit, and when a predetermined condition is satisfied, repeats control for causing the discharge circuit unit to perform the discharge operations so that the discharge current flows in the discharge path, and control for causing the discharge circuit unit to perform the charging operations so that the charging current flows in the charging path.

7. The control device for a vehicular power storage unit according to claim 6,
wherein when the predetermined condition is satisfied, the control unit repeats control for causing the discharge circuit unit to perform the discharge operations so that the discharge current flows in the discharge path within a voltage range where an output voltage of the power storage unit is greater than or equal to a predetermined voltage, and control for causing the charging circuit unit to perform the charging operations so that the charging current flows in the charging path, in an alternating manner.

8. The control device for a vehicular power storage unit according to claim 1,
wherein the holding unit is configured to fix the power storage unit and the board unit with the one board surface of the board unit facing an outer peripheral side of the power storage unit; and
the heat-emitting component is disposed in a region between an outer circumferential part of the power storage unit and the board unit.

9. The control device for a vehicular power storage unit according to claim 1,
wherein the holding unit includes a support part that is disposed in a region between the one board surface of the board unit and an outer circumferential part of the power storage unit, and that supports the outer circumferential part of the power storage unit;
an opening passing from a power storage unit side surface to a board unit side surface of the support part is formed in the support part; and
the heat-emitting component is disposed in at least one of a position facing an open region of the opening and a position inserted into the opening.

10. The control device for a vehicular power storage unit according to claim 1,
wherein a heat transfer member that makes contact with the heat-emitting component and the power storage unit is provided in a region between the heat-emitting component and the power storage unit.

11. The control device for a vehicular power storage unit according to claim 1,
wherein the power storage unit is disposed extending in a predetermined direction along the one board surface; and
a plurality of the heat-emitting components arranged in the predetermined direction are disposed facing the power storage unit.

12. A vehicular power storage device comprising:
the control device for a vehicular power storage unit according to claim 1; and
a power storage section including one or more of the power storage units.

* * * * *